United States Patent
Li et al.

(10) Patent No.: US 7,197,193 B2
(45) Date of Patent: Mar. 27, 2007

(54) APPARATUS AND METHOD FOR THREE DIMENSIONAL IMAGE RECONSTRUCTION

(75) Inventors: Shuhong Li, North Potomac, MD (US); Cha-Min Tang, Radnor, PA (US); Cha-Mei Tang, Potomac, MD (US)

(73) Assignee: Creatv MicroTech, Inc., Potomac, MD (US)

( * ) Notice: Subject to any disclaimer, the term of this patent is extended or adjusted under 35 U.S.C. 154(b) by 731 days.

(21) Appl. No.: 10/429,258

(22) Filed: May 5, 2003

(65) Prior Publication Data

US 2003/0228053 A1    Dec. 11, 2003

Related U.S. Application Data

(63) Continuation-in-part of application No. 10/427,999, filed on May 2, 2003, now abandoned.

(60) Provisional application No. 60/377,225, filed on May 3, 2002.

(51) Int. Cl.
*G06K 9/36* (2006.01)

(52) U.S. Cl. .................................... 382/285
(58) Field of Classification Search ................ 382/285, 382/154; 345/419, 420, 421–427; 348/580
See application file for complete search history.

(56) References Cited

U.S. PATENT DOCUMENTS 6,418,243 B1 * 7/2002 Skoglund et al. ........... 382/274

2003/0016218 A1 * 1/2003 Zwicker et al. ............. 345/424

OTHER PUBLICATIONS

Holmes et al. Simultaneous image and point spread function reconstruction for 3D light microscopy. SPIE vol. 2302 Image Reconstruction and Restoration 1994, pp. 359-368.*

* cited by examiner

*Primary Examiner*—Jingge Wu
*Assistant Examiner*—Brian Le
(74) *Attorney, Agent, or Firm*—Roylance, Abrams, Berdo & Goodman L.L.P.

(57) ABSTRACT

An instrument to acquire and methods to obtain three-dimensional (3D) images from a series of two-dimensional (2D) images which are obtained without moving the relative positions of the target, the detector, or the focusing lens is disclosed. The 2D images consist of one centered image obtained with the aperture at the center of optical system, and at least two directional images obtained with apertures at off-axis locations. The images can be obtained simultaneously or sequentially. The blurred 2D images are sectioned by computational method using point spread function of the optical system resulting in a set of decoupled 2D layers of the 3D object. The layered images are then sharpened by deconvolution using point spread function. The 3D reconstructed image is displayed. This technique provides fast data acquisition and fast image reconstruction and eliminates problems associated with motion, phototoxicity and photobleaching.

27 Claims, 31 Drawing Sheets

(a) (b)

$W_{PSF}(x, y, nz)$ $E_{PSF}(x, y, nz)$ $C_{PSF}(x, y, nz)$

−6
 −5
 −4

−3
 −2
 −1

0

+1
 +2
 +3

+4
 +5
 +6

−6  −5  −4

−3  −2  −1

0

+1  +2  +3

+4  +5  +6

$A2(-6)$  $A2(-5)$  $A2(-4)$ $A2(-3)$  $A2(-2)$  $A2(-1)$ $A2(0)$ $A2(+1)$  $A2(+2)$  $A2(+3)$ $A2(+4)$  $A2(+5)$  $A2(+6)$

A3(−6)     A3(−5)     A3(−4)

A3(−3)     A3(−2)     A3(−1)

A3(0)

A3(+1)     A3(+2)     A3(+3)

A3(+4)     A3(+5)     A3(+6)

A2(−6)         A2(−5)         A2(−4)

A2(−3)         A2(−2)         A2(−1)

A2(0)

A2(+1)         A2(+2)         A2(+3)

A2(+4)         A2(+5)         A2(+6)

−6

−5

−4

−3

−2

−1

0

+1

+2

+3

+4

+5

+6

−6 −5 −4

−3 −2 −1

0

+1 +2 +3

+4 +5 +6

−6

−5

−4

−3

−2

−1

0

+1

+2

+3

+4

+5

+6

(a)

(b)

(c)

APPARATUS AND METHOD FOR THREE DIMENSIONAL IMAGE RECONSTRUCTION

CROSS REFERENCE TO RELATED APPLICATIONS

This application is a continuation-in-part application of U.S. patent application Ser. No. 10/427,999, entitled "Three Dimensional Image Reconstruction Algorithm", which was filed on May 2, 2003, now abandoned by Shuhong Li et al.

GOVERNMENT INTEREST

The invention was made with Government support under Grant No. R43 MH60528, awarded by the National Institutes of Health. The Government may have certain rights in the invention.

Related subject matter is disclosed in co-pending U.S. provisional patent application Ser. No. 60/377,225, filed May 3, 2002, the entire contents of which are incorporated by reference.

FIELD OF THE INVENTION

This invention relates to three-dimensional (3D) image reconstruction of thick objects. It is useful in microscopy, photography and diagnostic medical imaging, but is not limited to these applications. An aspect of this invention provides an instrument to acquire images and a method to reconstruct and display 3D images that may be used for many 3D imaging applications.

BACKGROUND OF THE INVENTION

The three-dimensional (3D) nature of thick specimen presents a difficult challenge for imaging with two-dimensional (2D) detectors. Proper interpretation of thick microscopic specimen requires not only high resolution imaging of structures in the plane of focus, but also the context of the high resolution image of the overall structure. Ideally, an observer should be able to easily perceive the relative axial position of structures outside the focal plane and the overall structure presented with high depth of field.

Traditional microscopy methods can not simultaneously provide high resolution and high depth of field. Nor can they distinguish between structures that are in front and in back of the focal plane. Recent optical sectioning methods (i.e. confocal, deconvolution, and two-photon microscopy) allow for 3D reconstruction. But they typically require the sequential acquisition of a stack of 2D images at different focal planes. For example, confocal microscopy extracts 3D information from a z-stack of many optical sections at different level of focus, and the pinhole rejects the vast majority of the light gathered by the objective. This is an inefficient process that leads to limitations in certain circumstances. The most serious problems are phototoxicity when imaging live tissue, photobleaching of weakly fluorescent specimens, and slow image acquisition of thick specimen. Furthermore, the costs and maintenance needs of confocal and two photon microscopes render them less accessible to many users.

Software techniques, e.g., using 3D deconvolution of a large number of coupled 2D images taken at different focal plane, have been suggested as a less expensive option. In this approach, a set of images are taken focusing at various depths by moving the slide up and down or changing the focus. The images of the object in each plane are related to images of objects in other planes, because the image from any focal plane contains light from points located in that plane as well as blurred light from points in other focal planes. There are many varieties of deconvolution algorithms using point spread function. A blind deconvolution method that uses a filter function to resemble the point-spread-function is also available. The disadvantages of this approach are the long reconstruction time, uncertain image convergence and the prerequisite of a z-stack of images, which requires long image acquisition time and causes photobleaching and phototoxicity.

Hence, there remains a need for a new approach to extracting comparable 3D information from a single focal plane. Such approach might improve dramatically image acquisition efficiency, in terms of time and light exposure, and avoids photobleaching, phototoxicity and effects of motion.

SUMMARY OF THE INVENTION

An object of the present invention provides a hybrid optical system/computational approach that can extract comparable three-dimensional (3D) information from a single focal plane. This approach may improve image acquisition efficiency, eliminate effects caused by motion and minimize problems such as photobleaching and phototoxicity.

An embodiment of the present invention provides a hardware attachment consisting of centered and off-axis apertures, lenses and cameras, adaptable for use for obtaining centered and directional images.

The images can be acquired sequentially in time or simultaneously. The image can be captured by one or more cameras.

For microscopes, the apertures can be located in the back focal plane or the aperture plane of the microscope.

One embodiment of the present invention provides for a method of two-dimensional (2D) image acquisition and 3D reconstruction procedure includes at least one of the following steps: (a) acquiring 2D images (as few as three images); (b) splitting the 2D image into different depth resulting in a set of decoupled 2D layers of the 3D object; (c) obtaining a sharpened 3D object by deconvolving the set of decoupled 2D images using point spread function (PSF) of the optical system; and (d) displaying the image.

An embodiment of the present invention provides techniques for obtaining 3D images from three or more 2D images of the same object, consisting of one centered image acquired with aperture located on axis and two or more directional images taken with apertures located off axis.

Another embodiment of the present invention provides techniques to sections the acquired 2D images into many depth layers to form a 3D image such that the image in each sectioned layer is decoupled from other layers using PSF associated with the imaging system.

Another embodiment of the present invention provides techniques to sharpen the image in each layer by deconvolution using PSF.

An embodiment of the present invention provides algorithms for the display of the image indicating the 3D structure of the imaged object.

Another embodiment of the present invention provides a method adaptable for use for obtaining PSF. An example for a microscope is described using sub-resolution beads distributed at appropriate depth and suspended in a fixed mounting media to obtain centered and directional images of the PSFs.

An embodiment of the present invention provides an algorithm of selecting PSFs for layering from the centered and directional images obtain using sub-resolution beads.

BRIEF DESCRIPTION OF THE DRAWINGS

These and other features and advantages of the present invention will be more readily understood from the following detailed description, when read in connection with the appended drawings, in which.

DETAILED DESCRIPTION OF THE INVENTION

Figure 1:
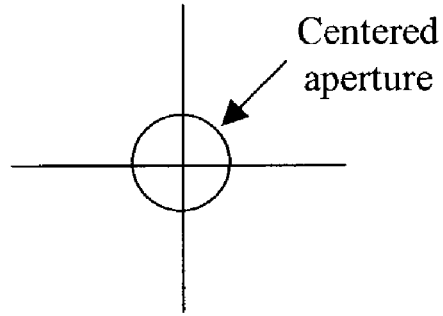
FIG. 1(a) depicts the centered aperture.
FIG. 1(b) depicts the four directional apertures.
Figure 1:
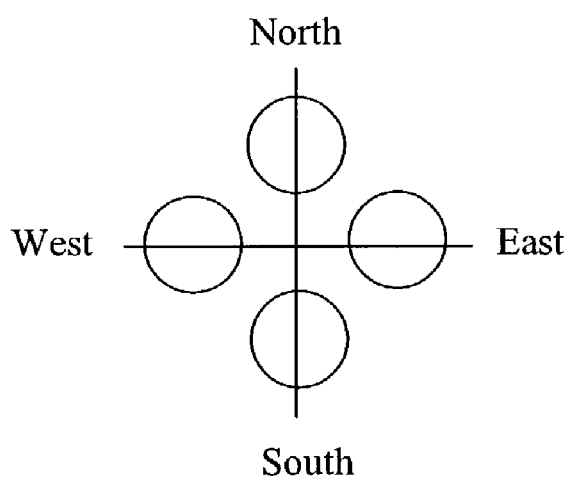

It is to be understood that this invention is not limited to the particular methodologies, protocols, constructs, formulae and reagents described and as such may vary. It is also to be understood that the terminology used herein is for the purpose of describing particular embodiments only, and is not intended to limit the scope of the present invention.

It must be noted that as used herein and in the appended claims, the singular forms "a," "and," and "the" include plural reference unless the context clearly dictates otherwise. Thus, for example, reference to "a peptide" is a reference to one or more peptides and includes equivalents thereof known to those skilled in the art, and so forth.

Unless defined otherwise, all technical and scientific terms used herein have the same meaning as commonly understood to one of ordinary skill in the art to which this invention belongs. Although any methods, devices, and materials similar or equivalent to those described herein can be used in the practice or testing of the invention, the preferred methods, devices and materials are now described.

All publications and patents mentioned herein are incorporated herein by reference for the purpose of describing and disclosing, for example, the constructs and methodologies that are described in the publications that might be used in connection with the presently described invention. The publications discussed above and throughout the text are provided solely for their disclosure prior to the filing date of the present application. Nothing herein is to be construed as an admission that the inventor is not entitled to antedate such disclosure by virtue of prior invention.

This invention relates to three-dimensional (3D) image reconstruction useful in microscopy, photography and diagnostic medical imaging, such as retinal vessel imaging. Traditional imaging methods have limited success in providing simultaneous, high resolution and high depth of field without obtaining a series of images at different positions of focus.

Recent optical sectioning methods (i.e. confocal, deconvolution, and two-photon microscopy) allow for 3D reconstruction, but they typically require the acquisition of a stack of two-dimensional (2D) images at different focal planes. For example, confocal microscopy extracts 3D information from a z-stack of many optical sections at different level of focus, and the pinhole rejects the vast majority of the light gathered by the objective. Despite its wide use and technological advances confocal microscopy has practical limitations such as the bleaching of fluorescent dyes, especially when dealing with live specimens with even a modest degree of thickness. The most common problems are phototoxicity that kills live cells, and photobleaching that causes variation in image quality across the specimen. Furthermore, the costs and maintenance needs of confocal and two photon microscopes render them less accessible to many users.

Previous software techniques using 3D deconvolution of a large number of coupled 2D images taken at different focal planes have been suggested. See, e.g., Wallace et al., 31(5) BIOTECHNIQUES, 1076–97 (2001). In this approach, a set of images is taken focusing at various depths by moving the slide up and down. The images are related to each other because the image from any focal plane contains light from points located in that plane as well as blurred light from points in other focal planes. There are many varieties of deconvolution algorithms such as Gold's method, Richard-Lucy method, Schell's method, Jansson's method. See Jansson, DECONVOLUTION OF IMAGES & SPECTRA (P. A. Jansson, ed., Academic Press, New York, 1997). A blind deconvolution method that uses a filter function to resemble the point-spread-function is also available. See J. N. Caron, et al. 26(15) OPTICS LETTERS, 1164–66 (2001). The disadvantages of current approaches include long reconstruction time, uncertain image convergence, long image acquisition time, photobleaching and phototoxicity.

An embodiment of the invention described herein provides for a hybrid optical image acquisition system/computational approach that can extract comparable 3D information. The 3D image acquisition and reconstruction procedure includes at least one of the following steps: (a) acquiring images (as few as three images); (b) splitting the 2D image into different depth resulting in a set of decoupled 2D layers of the 3D object; (c) obtaining a sharpened 3D object by deconvolving the set of decoupled 2D images using point spread function (PSF) of the optical system; and (d) displaying the image.

An embodiment of the present invention provides a process for obtaining 3D images from a series of 2D images by acquiring one centered image with aperture located on axis and two or more directional images of the same object taken with same numerical aperture. In one embodiment, the images can be obtained sequentially in time using one camera. Since the number of images to be taken is very few, efficiencies of time and light exposure of image acquisition improves compared with confocal or full deconvolution methods. Thus, photobleaching of fluorescent dyes and phototoxicity may be minimized.

Furthermore, multiple images can be taken simultaneously by as few as a single exposure, using one camera or multiple numbers of cameras. In the case of a single exposure, photobleaching and phototoxicity is at its minimum. Most important of all, this method allows 3D imaging when the subject requires image acquisition within a short period. For example, imaging of the blood vessel in the back of the retina has to be taken with short exposure to avoid blinking and motion.

Another embodiment of the present invention provides a technique that sections the set of centered and directional 2D images into many depth layers to form a 3D image such that the object in each layer is decoupled from other layers by applying PSF associated with the imaging system.

Light emitted from each point in the object produces a blurred image in the form of PSF of the imaging optical system. Thus, the image of the object is mathematically modeled as a convolution of the object with the PSF. See Eugene Hecht, OPTICS, 524–32 (3rd ed, Addison Wesley Longman, Inc. 1998). The image from any focal plane contains blurred light from points located in that plane mixed with blurred light from points originated from other focal planes.

Thus, the layered image is blurred. Using PSF, high resolution 3D information can be extracted from the blurred image. Another embodiment of the present invention provides a technique to sharpen the image in each layer by deconvolution algorithms using PSF. The deconvolution for the 3D image reconstruction described in this invention is faster than conventional deconvolution methods where a stack of blurred 2D images are coupled requiring full 3D deconvolution, while each layered image for this invention is decoupled from other layers requiring only 2D deconvolution. 2D deconvolution is much faster and more numerically stable.

In another embodiment of the present invention, variations of image reconstruction algorithm are allowed resulting from variation of the number of images acquired and their aperture shape and location.

An embodiment of the present invention provides algorithms for the display of the reconstructed object indicating the 3D structure of the imaged object.

Figure 2:
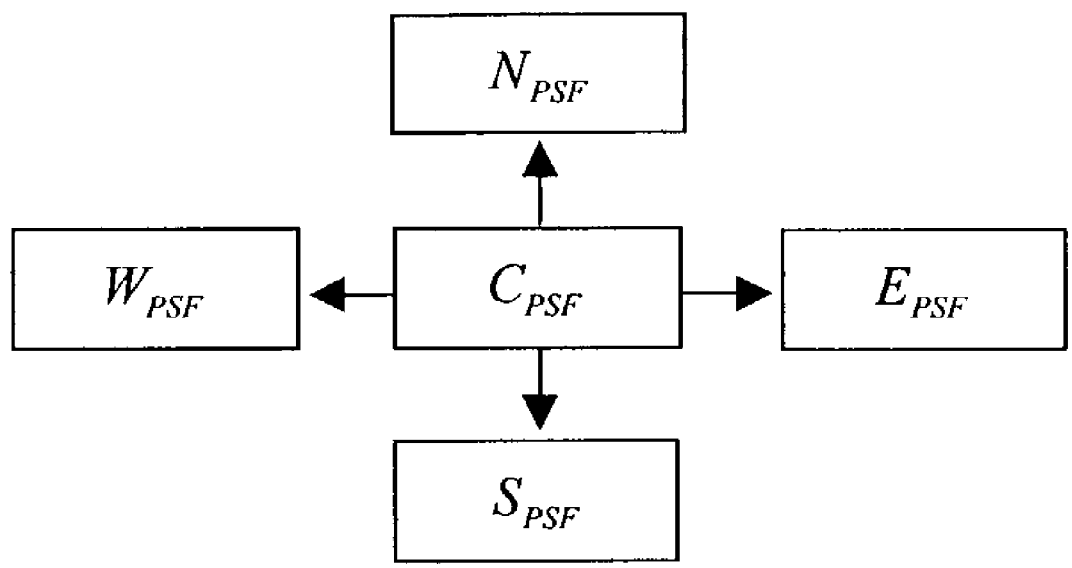
FIG. 2 shows the relationship of the centered and directional point spread functions (PSF)

An example of the image acquisition, reconstruction and display algorithm is given for a centered image and four directional images. This example is chosen due to the simplicity of terminology, but it does not serve to limit the invention. The centered image is obtained with the aperture at the center of optical system. Directional images are obtained with spatial filtered apertures at off-axis locations shown in FIG. 1. Four orthogonal directional images are called south, north, west and east in this patent as indicated in Table 1. The relative spatial relationships of the centered and directional PSF are shown in FIG. 2.

TABLE 1

Images required by reconstruction

| | |
|---|---|
| $C(x, y)$ | Image with centered aperture |
| $S(x, y)$ | South directional image |
| $N(x, y)$ | North directional image |
| $W(x, y)$ | West directional image |
| $E(x, y)$ | East directional image |

All images should be acquired using the same numerical aperture. Medium or low numerical apertures would provide thicker depth of field information. Sharpness of images provided by high numerical aperture can be obtained by deconvolution.

PSF for the microscope for the centered image and the four directional images are used for this example. The PSF only has to be done once for the optical system and can be used repeatedly under the same image acquisition conditions. The PSF can be either calculated based on physics principles or obtained empirically by acquiring images of micro-spheres or beads. To obtain PSF for the directional images and the centered image empirically, each micro-bead image should be obtained under the same optical conditions as the 2D images to be obtained later for 3D image reconstruction. These micro-spheres should be sub-resolution beads located at appropriate depth and suspended in a fixed mounting media. One or more sets of images of the beads, shown in Table 2, can be used to create a library of point-spread-functions.

TABLE 2

Images of Beads for Obtaining Point Spread Function

| | |
|---|---|
| $C_{BEAD}(x, y)$ | Micro-bead image with centered aperture |
| $S_{BEAD}(x, y)$ | South directional micro-bead image |
| $N_{BEAD}(x, y)$ | North directional micro-bead image |
| $W_{BEAD}(x, y)$ | West directional micro-bead image |
| $E_{BEAD}(x, y)$ | East directional micro-bead image |

Another embodiment of the present invention relates to a hardware attachment to provide the apertures, lenses and the image capture camera system.

For conventional microscopes, the hardware is an attachment that provides the means to obtain a series of image of the object from different directional perspectives without changing the focus of the imaging system. Light gathered by the lens of a conventional microscope can be partitioned at the aperture plane or one of its conjugate planes with the use of spatial filters. Because the aperture plane inside the microscope is inaccessible, a more accessible conjugate aperture plane can be created outside of the imaging device with the use of a relay lens system. For example, spatial filters may be placed at the back focal plane with aperture on axis for the centered image and off-axis apertures for directional images.

For a conventional microscope, three basic strategies can be used to record the image. The lens and camera system is described for each. (1) First, images may be acquired sequentially using a single camera for each of the spatial filter positions to obtain a center image and the directional images. (2) Secondly, the full cone of light is partitioned by apertures into individual trajectories and guided by lens system to its own CCD camera for image recording. In this configuration all the images can be recorded simultaneously. (3) Alternatively, the partitioned light bundles can be projected onto a single CCD detector and acquired simultaneously. For three directional images example, the centered and three different directional images can occupy different quadrants of the image plane of a CCD camera. For a four directional image example, the four directional images can be captured in four quadrants of one CCD camera, and the centered image is captured by the same camera or different camera.

For image capture using long focal lens microscopes and conventional cameras, the aperture can be in the aperture plane or a different focal plane. Similarly, the images can be obtained sequentially, or multiple cameras/lens systems can be used to obtain the images simultaneously.

For images to be taken with hand held cameras, multiple cameras in different locations can be used.

IMPLEMENTATION EXAMPLES

I. Example of One Implementation

A more detailed description of an algorithm of an embodiment of the present invention is now provided. The algorithm of this embodiment is composed of four main parts: obtaining PSF; optical sectioning; deconvolution; and 3D image displays. The following example uses four directional images. The off-axis apertures are identical in shape to the centered aperture. They are located at equal distance from the axis and space 90 degrees apart in angular direction as shown in FIG. 1.

A. Obtaining Point Spread Function

Figure 3:
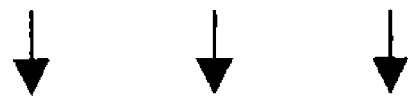
FIG. 3 illustrates an approach to cutting PSF kernels from centered and directional images.
Figure 3:
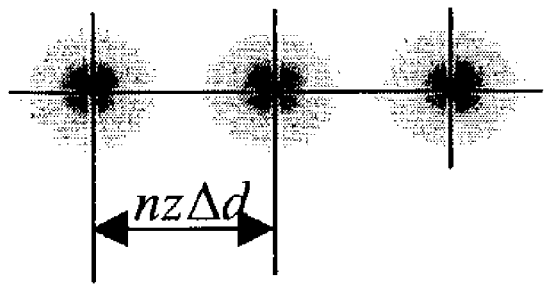
Figure 3:
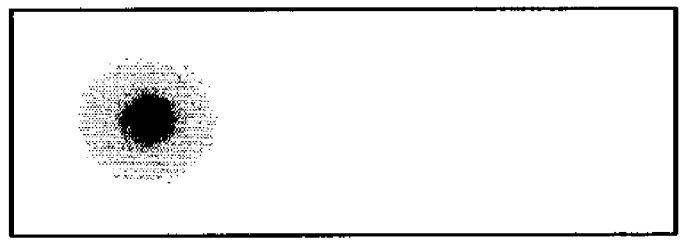
Figure 3:
Figure 3:
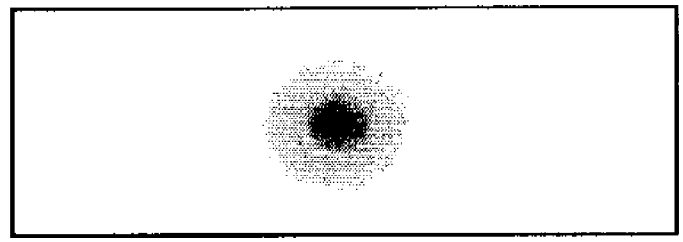
Figure 4:
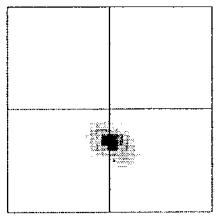
FIG. 4 shows the PSF at each layer for south image.
Figure 4:
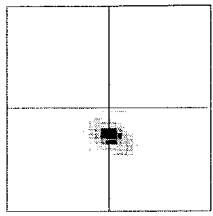
Figure 4:
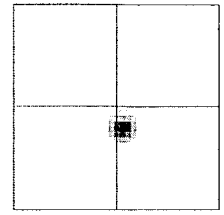
Figure 4:
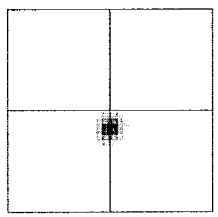
Figure 4:
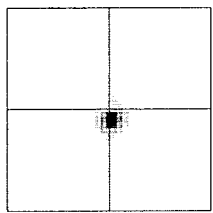
Figure 4:
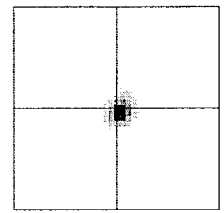
Figure 4:
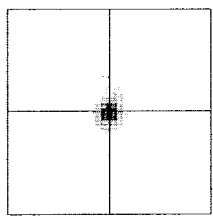
Figure 4:
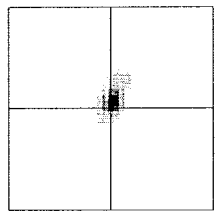
Figure 4:
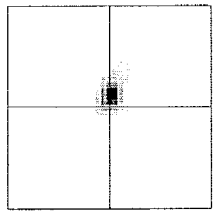
Figure 4:
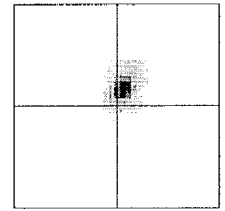
Figure 4:
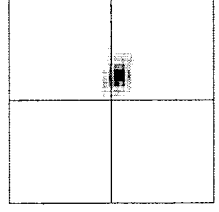
Figure 4:
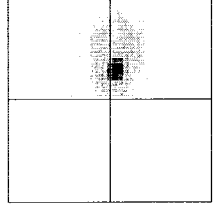
Figure 4:
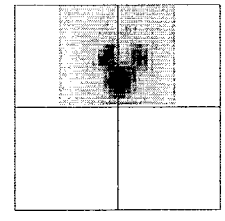
Figure 5:
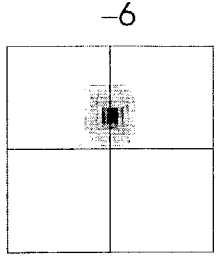
FIG. 5 shows the PSF at each layer for north image.
Figure 5:
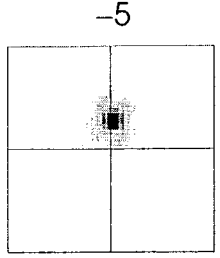
Figure 5:
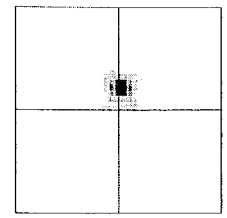
Figure 5:
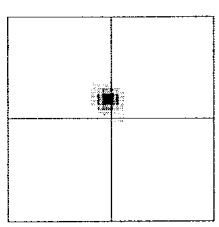
Figure 5:
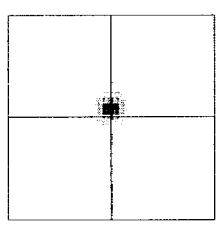
Figure 5:
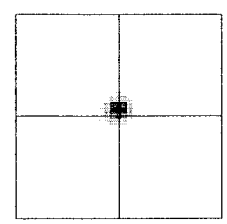
Figure 5:
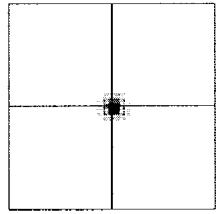
Figure 5:
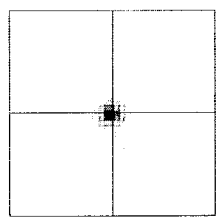
Figure 5:
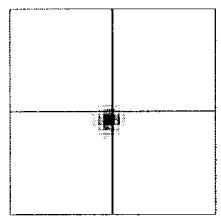
Figure 5:
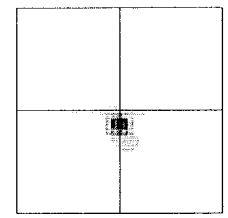
Figure 5:
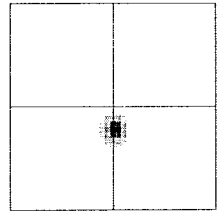
Figure 5:
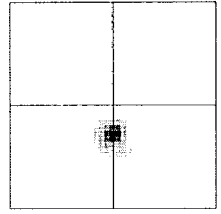
Figure 5:
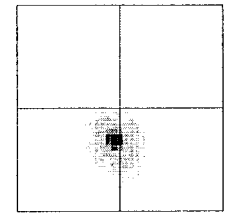
Figure 6:
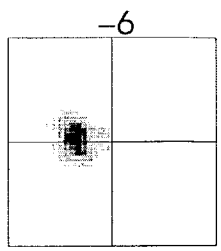
FIG. 6 shows the PSF at each layer for west image.
Figure 6:
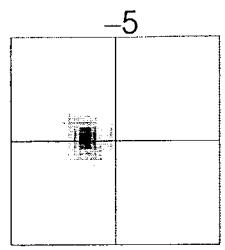
Figure 6:
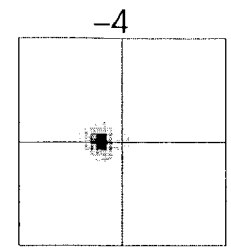
Figure 6:
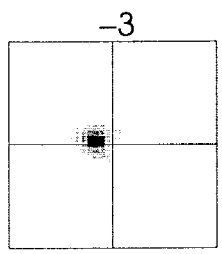
Figure 6:
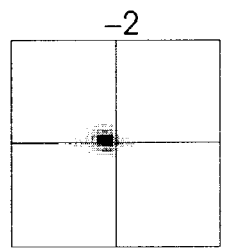
Figure 6:
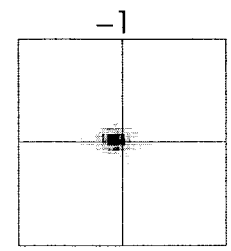
Figure 6:
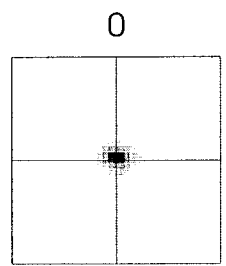
Figure 6:
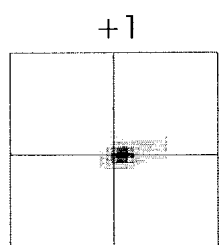
Figure 6:
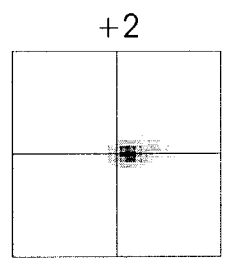
Figure 6:
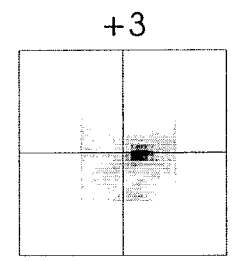
Figure 6:
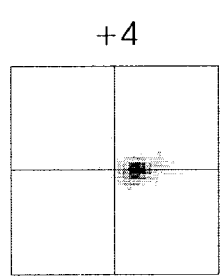
Figure 6:
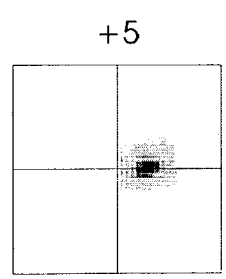
Figure 6:
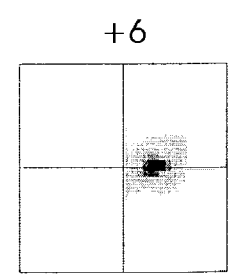
Figure 7:
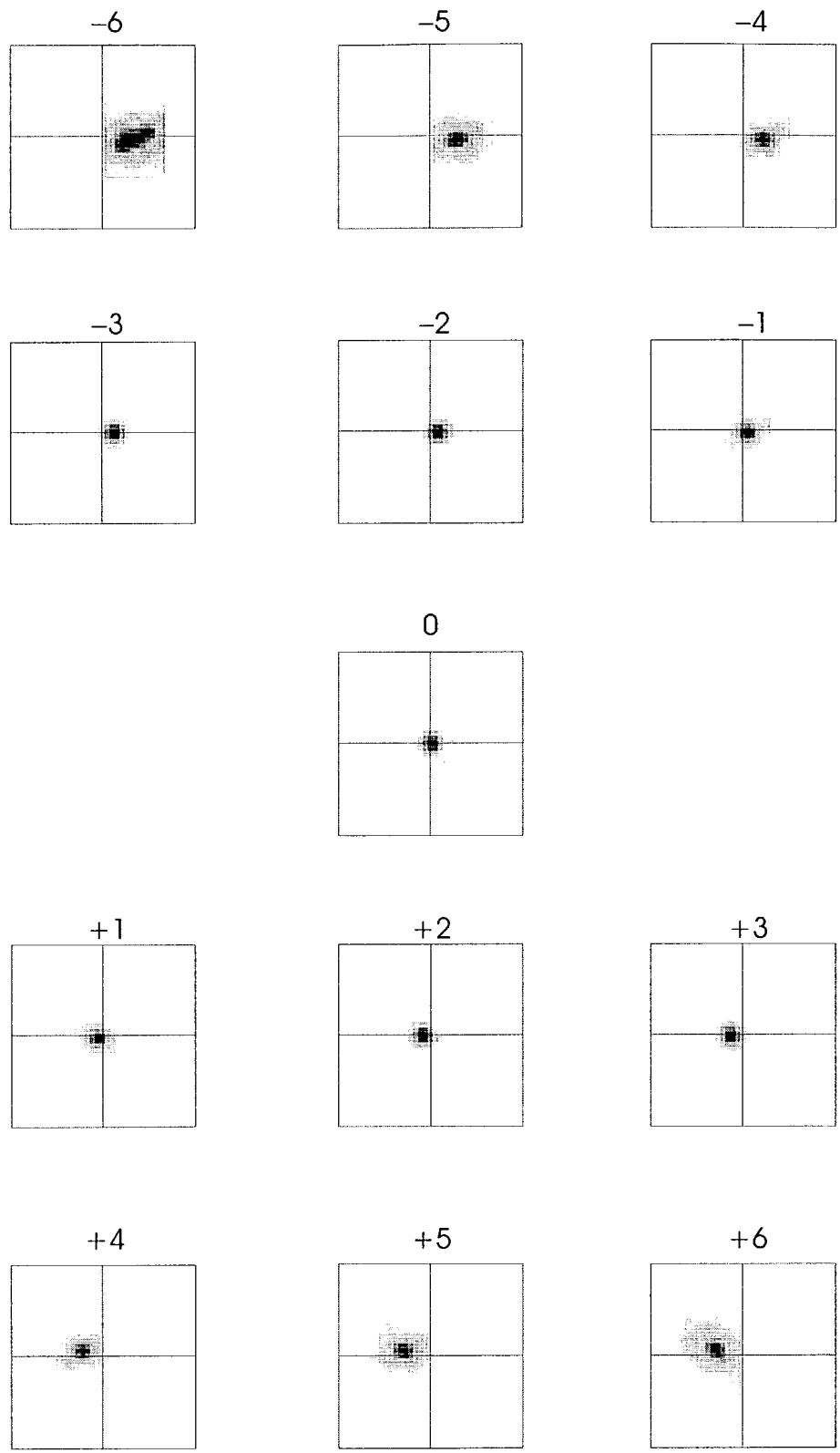
FIG. 7 shows the PSF at each layer for east image.

PSF can be obtained using sub-resolution micro-beads. The micro-bead images for the centered and directional apertures are $C_{BEAD}$, $S_{BEAD}$, $N_{BEAD}$, $W_{BEAD}$, and $E_{BEAD}$, respectively. For ease of visualization and manipulation, the centered and direction micro-bead images can each given a different color and assembled together into one color image to evaluate the shift of the peak of the PSF. As an example of one micro-bead, FIG. 3 shows the concept for a pair of directional images using shades of gray. For an in-focus bead, the directional images show the bead located at the same position. For an out-of-focus bead, the images separate. The direction and the amount of the shift of the center of the point spread function of the bead is depends on the off-axis aperture and by how far the bead is above or below the in-focus plane. The direction of the shift depends on whether the bead is above or below the in-focus plane.

The symbols for the PSF are shown in Table 3. Each PSF is a blurred 3D image of a micro-bead consisting of series of blurred 2D images for each z positions. nz is layer number, it changes from $-N$ to $+N$. $nz=0$ is the in-focus layer. Positive signed nz denotes layers above the focal plane, and minus signed nz denotes layers below the focal plane. Layer number nz denotes the layer that the PSF of the direction image is shifted by $nz\Delta d$ from the centered image, where $\Delta d$ is the distance that the center of the directional image is shifted from the center axis for the nz layer. The distance in the axial direction between two layers is denoted as $\Delta z$.

TABLE 3

Point Spread Functions

| | |
|---|---|
| $C_{PSF}(x, y, nz)$ <br> $nz = -N, -(N-1), \ldots, -2, -1, 0, +1, +2, \ldots, +(N-1), +N$ | Point spread functions for c entered image, at different z position |
| $S_{PSF}(x, y, nz)$ <br> $nz = -N, -(N-1), \ldots, -2, -1, 0, +1, +2, \ldots, +(N-1), +N$ | Point spread functions for southern image, at different z position |
| $N_{PSF}(x, y, nz)$ <br> $nz = -N, -(N-1), \ldots, -2, -1, 0, +1, +2, \ldots, +(N-1), +N$ | Point spread functions for northern image, at different z position |
| $W_{PSF}(x, y, nz)$ <br> $nz = -N, -(N-1), \ldots, -2, -1, 0, +1, +2, \ldots, +(N-1), +N$ | Point spread functions for western image, at different z position |
| $E_{PSF}(x, y, nz)$ <br> $nz = -N, -(N-1), \ldots, -2, -1, 0, +1, +2, \ldots, +(N-1), +N$ | Point spread functions for eastern image, at different z position |

In theory, the algorithm may generate as many layers as needed. For example, if the user collects 13 layers, then $nz=-6,-5,\ldots,0,\ldots,+5,+6$. FIGS. 4–7 show an example of $S_{PSF}$, $N_{PSF}$, $W_{PSF}$ and $E_{PSF}$ images, respectively. All PSF images in the figures are inverted to white background so they are more visible. Center point is marked for all images. The total intensities of each layer are normalized to the same value.

B. Optical Sectioning

In image processing, correlation may be used for template matching. A target pattern is shifted to every location in an image, the values are multiplied by the pixels that are overlapped, and the total is stored at that position to form a new temporary image. The new temporary image will have larger values where regions are identical or similar to the target. See John C. Russ, THE IMAGE PROCESSING HANDBOOK, 341–344 (2nd ed. CRC press, Inc. 1995). The process starts with correlation of the image with the target pattern, $$\text{correlation}(x,y) = \int \int f(x',y') \cdot g(x'-x, y'-y) dx' dy', \quad (1)$$

where $f(x,y)$ is the original image, $g(x,y)$ is the target pattern, and correlation$(x,y)$ is the new temporary image.

Optical sectioning is the process that a set of layering images is formed showing only the features that are in each layer. In this aspect of the invention, optical sectioning is based on the following principle. The algorithm is based on correlations of directional image and its PSF at each layer. To locate features for nz layers, PSF at nz layer is used as the target pattern to correlate with the corresponding directional image. There are four sets of cross-correlations for south, north, west and east directional images. Each set has 2N+1 layers for different z positions.

$$CS(x, y, nz) = \int_{x'} \int_{y'} S(x', y') \cdot S_{PSF}(x'-x, y'-y, nz) dx' dy', \quad (2)$$

$$CN(x, y, nz) = \int_{x'} \int_{y'} N(x', y') \cdot N_{PSF}(x'-x, y'-y, nz) dx' dy',$$

$$CW(x, y, nz) = \int_{x'} \int_{y'} W(x', y') \cdot W_{PSF}(x'-x, y'-y, nz) dx' dy',$$

$$CE(x, y, nz) = \int_{x'} \int_{y'} E(x', y') \cdot E_{PSF}(x'-x, y'-y, nz) dx' dy',$$

where $nz=-N,-(N-1),\ldots,-2,-1,0,+1,+2,\ldots,+(N-1),+N$.

Optical sectioning may be achieved by combining the four sets of cross-correlations together to form the layering image. Optical sectioning, in one aspect of the present invention, may be illustrated mathematically. For each directional image, it is the convolutions of object and directional PSF.

$$S(x', y') = \text{Object}(x', y', nz') \otimes S_{PSF}(x', y', nz') \qquad (3)$$
$$= \int_\xi \int_\eta \int_{nz'} \text{Object}(\xi, \eta, nz') \cdot S_{PSF}(x' - \xi, y' - \eta, -nz') d\xi d\eta dnz',$$

$$N(x', y') = \text{Object}(x', y', nz') \otimes N_{PSF}(x', y', nz') \qquad (4)$$
$$= \int_\xi \int_\eta \int_{nz'} \text{Object}(\xi, \eta, nz') \cdot N_{PSF}(x' - \xi, y' - \eta, -nz') d\xi d\eta dnz',$$

$$W(x', y') = \text{Object}(x', y', nz') \otimes W_{PSF}(x', y', nz') \qquad (5)$$
$$= \int_\xi \int_\eta \int_{nz'} \text{Object}(\xi, \eta, nz') \cdot W_{PSF}(x' - \xi, y' - \eta, -nz') d\xi d\eta dnz',$$

$$E(x', y') = \text{Object}(x', y', nz') \otimes E_{PSF}(x', y', nz') \qquad (6)$$
$$= \int_\xi \int_\eta \int_{nz'} \text{Object}(\xi, \eta, nz') \cdot E_{PSF}(x' - \xi, y' - \eta, -nz') d\xi d\eta dnz'.$$

For centered image, it is the convolution of the object with the centered PSF.

$$C(x, y) = \text{Object}(x, y, nz') \otimes C_{PSF}(x, y, nz') \qquad (7)$$
$$= \int_0^X \int_0^Y \int_{-N}^{+N} \text{Object}(x', y', nz') \cdot C_{PSF}(x - x', y - y', -nz') dx' dy' dnz'.$$

Substituting Equation (3) into Equation (2), one obtains $$CS(x, y, nz) = \int_{x'} \int_{y'} S(x', y') \cdot S_{PSF}(x' - x, y' - y, nz) dx' dy' \qquad (8)$$
$$= \int_{x'} \int_{y'} \left[ \int_\xi \int_\eta \int_{nz'} \text{Object}(\xi, \eta, nz') \cdot S_{PSF}(x' - \xi, y' - \eta, -nz') d\xi d\eta dnz' \right] \cdot S_{PSF}(x' - x, y' - y, nz) dx' dy'$$
$$= \int_\xi d\xi \int_\eta d\eta \int_{nz'} dnz' \text{Object}(\xi, \eta, nz') \int_{x'} dx' \int_{y'} dy' S_{PSF}(x' - \xi, y' - \eta, -nz') \cdot S_{PSF}(x' - x, y' - y, nz)$$
$$= \int_\xi d\xi \int_\eta d\eta \int_{nz'} dnz' \text{Object}(\xi, \eta, nz') AI(\xi, \eta, nz, nz'), \quad \text{where}$$

$$AI(\xi, \eta, nz, nz') = \int_{x'} \int_{y'} S_{PSF}(x' - \xi, y' - \eta, -nz') \cdot S_{PSF}(x' - x, y' - y, nz) dx' dy'. \qquad (9)$$

Define (10)
$$\begin{cases} m = x' - x, \\ n = y' - y, \end{cases}$$

$$\begin{cases} dx' = dm \\ dy' = dn, \end{cases} \text{and} \qquad (11)$$

$$\begin{cases} x' - \xi = m - (\xi - x), \\ y' - \eta = n(\eta - y). \end{cases} \qquad (12)$$

Then equation (9) becomes $$AI(\xi, \eta, nz, nz') = \int_{x'} \int_{y'} S_{PSF}(x' - \xi, y' - \eta, -nz') \cdot S_{PSF}(x' - x, y' - y, nz) dx' dy' \qquad (13)$$
$$= \int_m \int_n S_{PSF}[m - (\xi - x), n - (\eta - y), -nz'] \cdot S_{PSF}(m, n, nz) dm dn.$$

Define (14)
$$\begin{cases} m' = \xi - x, \\ n' = \eta - y, \end{cases} \text{and}$$

$$\begin{cases} d\xi = dm', \\ d\eta = dn', \end{cases} \text{then} \qquad (15)$$

$$A1(m', n', nz, nz') = \int_m \int_n S_{PSF}(m - m', n - n', -nz') \cdot S_{PSF}(m, n, nz) dm dn. \qquad (16)$$

The equation A1 above becomes a correlation of $S_{PSF}$ at nz layer with $S_{PSF}$ at nz' layer. Equation (8) becomes $$CS(x, y, nz) = \int_{m'} dm' \int_{n'} dn' \int_{nz'} dnz' \text{Object}(m' + x, n' + y, nz') A1(m', n', nz, nz'). \qquad (17)$$

Similarly, other directional images can be written as $$CN(x, y, nz) = \int_{m'} dm' \int_{n'} dn' \int_{nz'} dnz' \text{Object}(m' + x, n' + y, nz') A2(m', n', nz, nz'), \qquad (18)$$

$$CW(x, y, nz) = \int_{m'} dm' \int_{n'} dn' \int_{nz'} dnz' \text{Object}(m' + x, n' + y, nz') A3(m', n', nz, nz'),$$

$$CE(x, y, nz) = \int_{m'} dm' \int_{n'} dn' \int_{nz'} dnz' \text{Object}(m' + x, n' + y, nz') A4(m', n', nz, nz').$$

where A2, A3, and A4 are $$A2(m', n', nz, nz') = \int_m \int_n N_{PSF}(m - m', n - n', -nz') \cdot N_{PSF}(m, n, nz) dm dn, \qquad (19)$$

$$A3(m', n', nz, nz') = \int_m \int_n W_{PSF}(m - m', n - n', -nz') \cdot W_{PSF}(m, n, nz) dm dn,$$

$$A4(m', n', nz, nz') = \int_m \int_n E_{PSF}(m - m', n - n', -nz') \cdot E_{PSF}(m, n, nz) dm dn.$$

The following example demonstrates how A1(m',n',nz,nz'), A2(m',n',nz,nz'), A3(m',n',nz,nz') and A4(m',n',nz,nz') are applied. In this example, there are 13 layers, i.e., nz'=−6 to +6. FIGS. 4 to 7 show point-spread functions for each layer for south, north, west and east directional images, respectively. Center point is marked for all images. The total intensities of each layer are normalized to be identical for display purposes. The sectioning of nz=−5 layer is described mathematically below as an example and illustrated by figures.

For nz=−5 layer, the cross-correlation of the south directional image is expressed as $$CS(x, y, -5) = \int_{m'} dm' \int_{n'} dn' \int_{nz'} dnz' \text{Object}(m' + x, n' + y, nz') A1(m', n', -5, -nz'), \qquad (20)$$

where $$A1(m', n', -5, nz') = \int_m \int_n S_{PSF}(m - m', n - n', -nz') \cdot S_{PSF}(m, n, -5) dm dn. \qquad (21)$$

Figure 8:
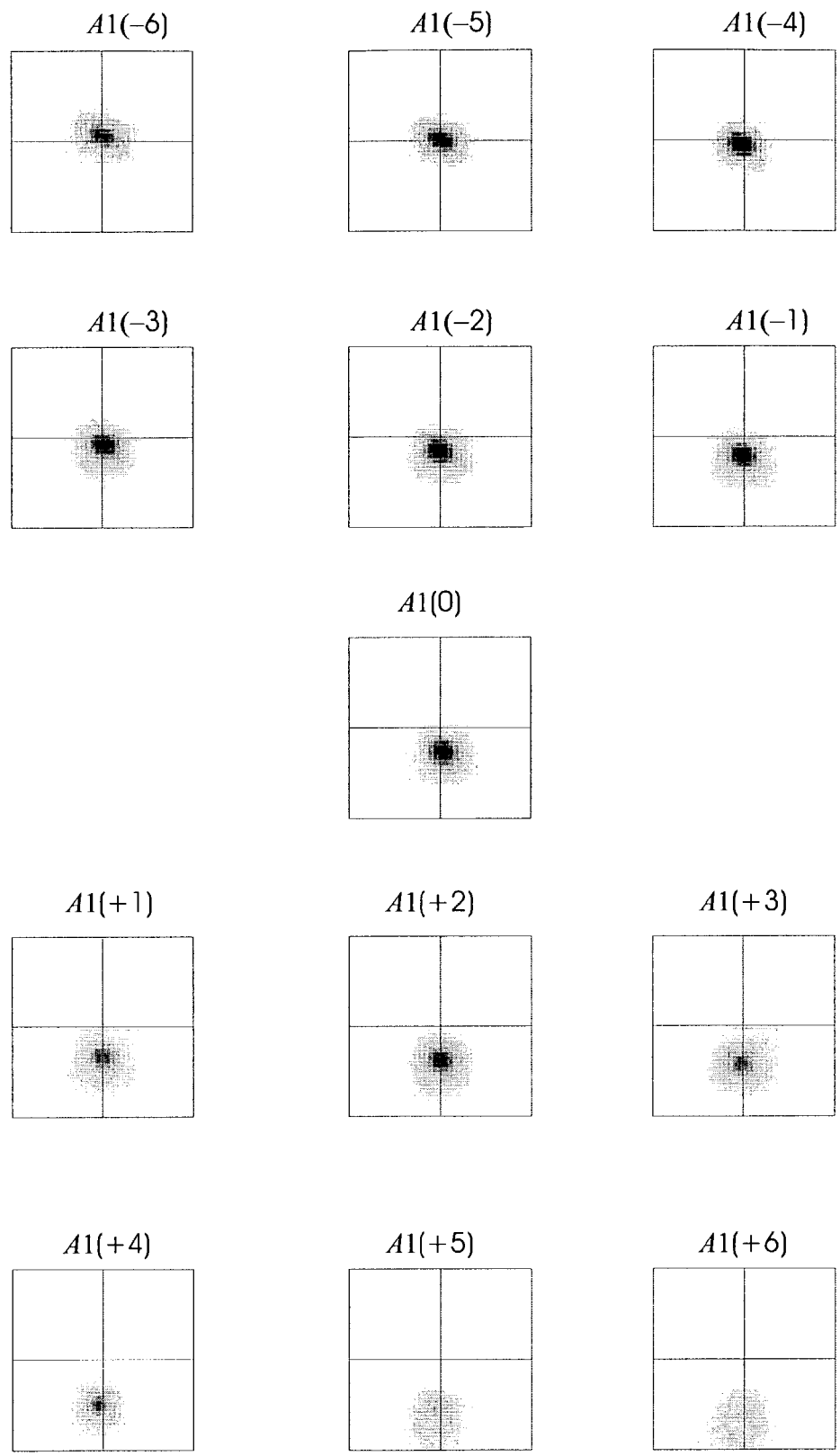
FIG. 8 shows the correlation of $S_{PSF}(x,y,-5)$ with $S_{PSF}(x,y,nz')$.

FIG. 8 shows A1(m',n',−5,nz') for nz'=−6,−5,−4,−3,−2,−1, 0,+1,+2,+3,+4,+5,+6.

For nz=−5 layer, the cross-correlation of the north directional image is expressed as $$CN(x, y, -5) = \int_{m'} dm' \int_{n'} dn' \int_{nz'} dnz' \text{Object}(m' + x, n' + y, nz') A2(m', n', -5, nz') \text{ where} \qquad (22)$$

-continued $$A2(m', n', -5, nz') = \int_m \int_n N_{PSF}(m - m', n - n', -nz') \cdot N_{PSF}(m, n, -5) dm dn. \qquad (23)$$

For nz=−5 layer, the cross-correlation of the west directional image is expressed as $$CW(x, y, -5) = \int_{m'} dm' \int_{n'} dn' \int_{nz'} dnz' \text{Object}(m' + x, n' + y, nz') A3(m', n', -5, -nz'), \qquad (24)$$

where $A3(m', n', -5, nz') =$ \qquad (25)

$$\int_m \int_n W_{PSF}(m - m', n - n', -nz') \cdot W_{PSF}(m, n, -5) dm dn.$$

For nz=−5 layer, the cross-correlation of the east directional image is expressed as $$CE(x, y, -5) = \int_{m'} dm' \int_{n'} dn' \int_{nz'} dnz' \text{Object}(m' + x, n' + y, nz') A4(m', n', -5, -nz'), \qquad (26)$$

where $A4(m', n', -5, nz') =$ \qquad (27)

$$\int_m \int_n E_{PSF}(m - m', n - n', -nz') \cdot E_{PSF}(m, n, -5) dm dn.$$

Figure 9:
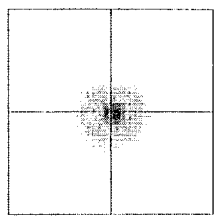
FIG. 9 shows the correlation of $N_{PSF}(x,y,-5)$ with $N_{PSF}(x,y,nz')$.
Figure 9:
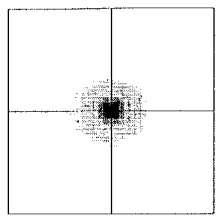
Figure 9:
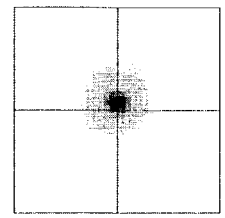
Figure 9:
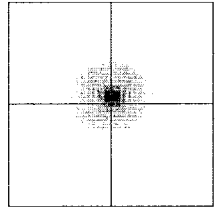
Figure 9:
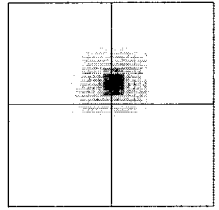
Figure 9:
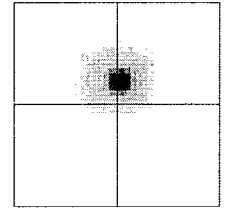
Figure 9:
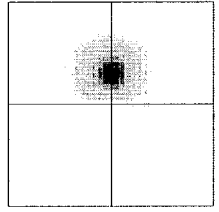
Figure 9:
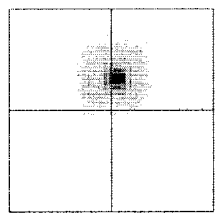
Figure 9:
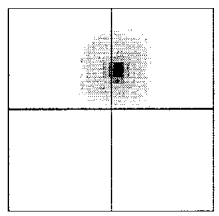
Figure 9:
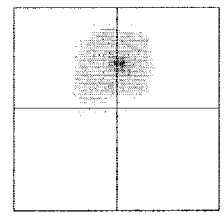
Figure 9:
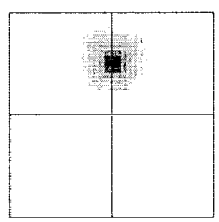
Figure 9:
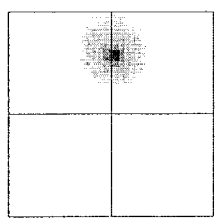
Figure 9:
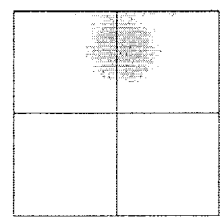
Figure 10:
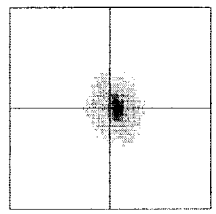
FIG. 10 shows the correlation of $W_{PSF}(x,y,-5)$ with $W_{PSF}(x,y,nz')$.
Figure 10:
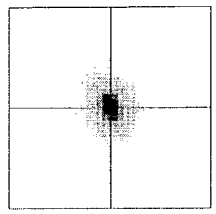
Figure 10:
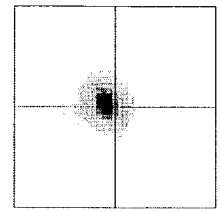
Figure 10:
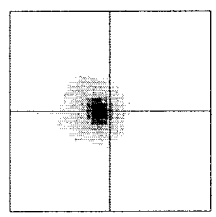
Figure 10:
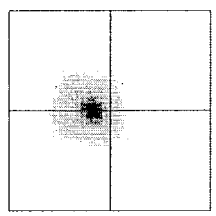
Figure 10:
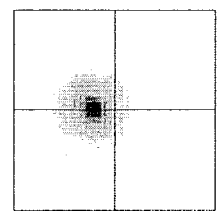
Figure 10:
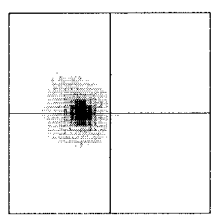
Figure 10:
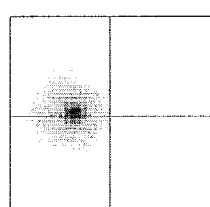
Figure 10:
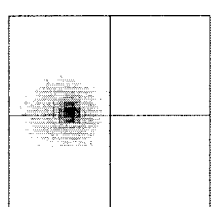
Figure 10:
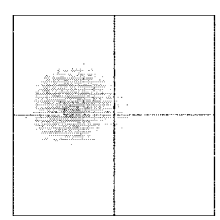
Figure 10:
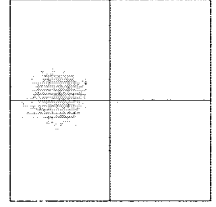
Figure 10:
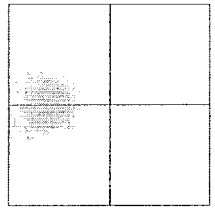
Figure 10:
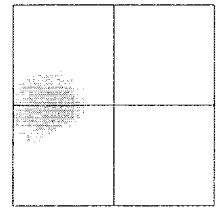
Figure 11:
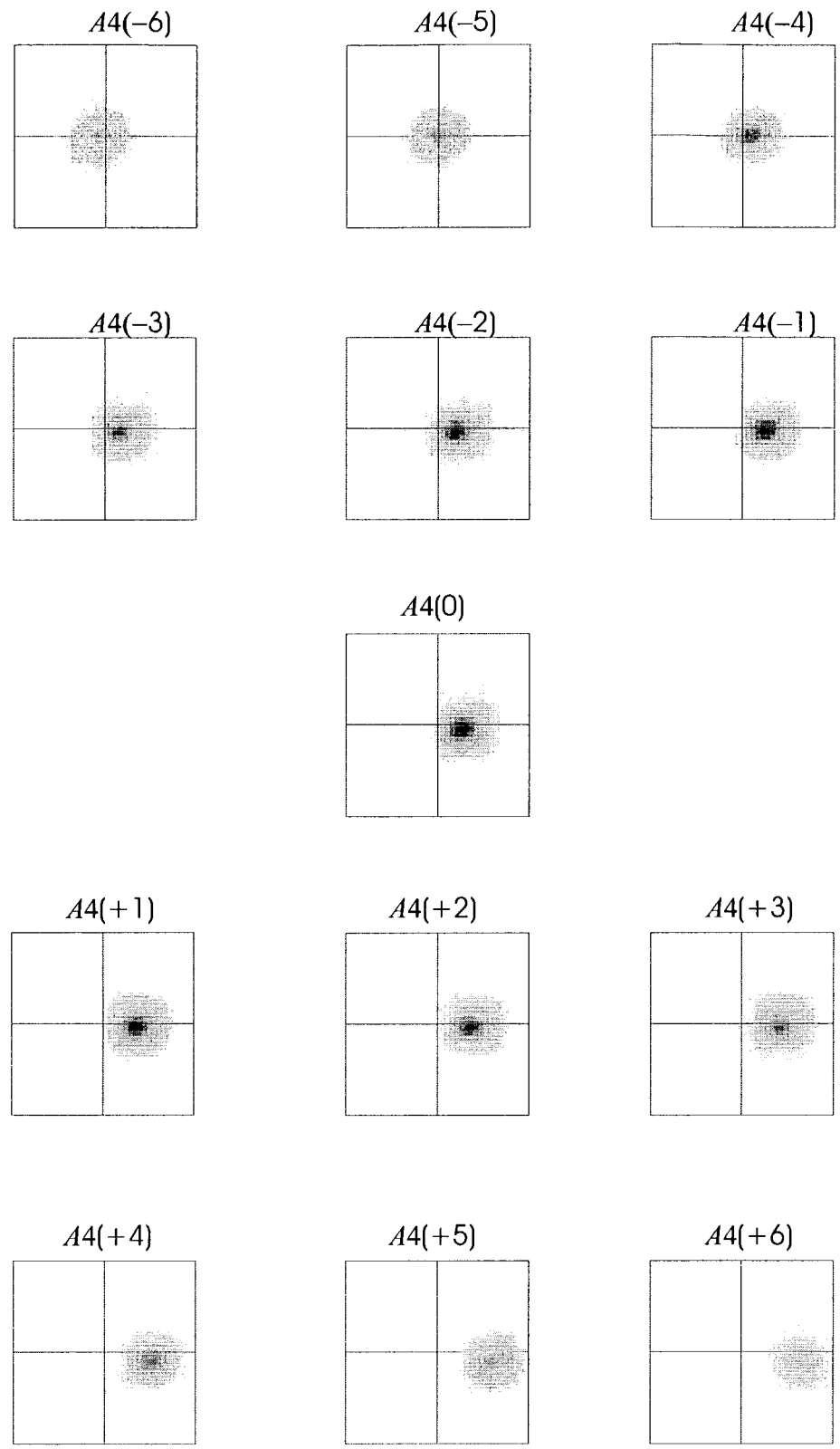
FIG. 11 shows the correlation of $E_{PSF}(x,y,-5)$ with $E_{PSF}(x,y,nz')$.

FIGS. 9 to 11 show the results of A2(m',n',−5,nz'), A3(m',n',−5,nz') and A4(m',n',−5,nz'), respectively, for nz'=−6,−5,−4,−3,−2,−1,0,+1,+2,+3,+4,+5,+6.

Auto-correlation is of interest, because the biggest value of auto-correlation is with itself and always locates at the center point. FIGS. 8 to 11 shows A1(m',n',−5,nz'), A2(m',n',−5,nz'), A3(m',n',−5,nz') and A4(m',n',−5,nz') for 13 different nz'. Locations of the largest value of the correlations are shifted from the center point, and the shifting directions correspond to directional images. The biggest values for A1(m',n',−5,−5), A2(m',n',−5,−5), A3(m',n',−5,−5) and A4(m',n',−5,−5) are on axis and they overlap only for nz'=−5.

Figure 12:
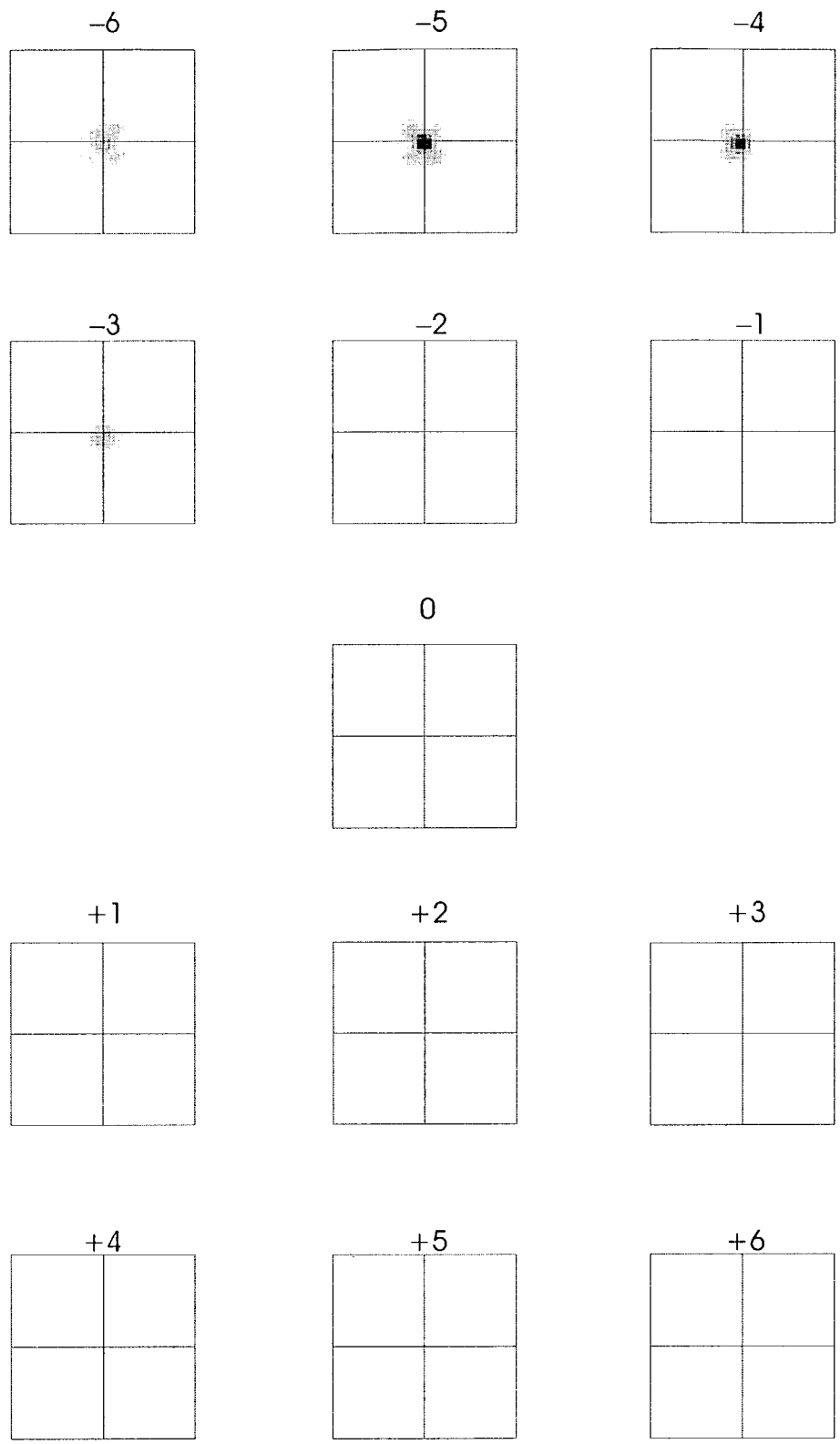
FIG. 12 shows a set of layering images by non-linear method for n=-5.
Figure 13:
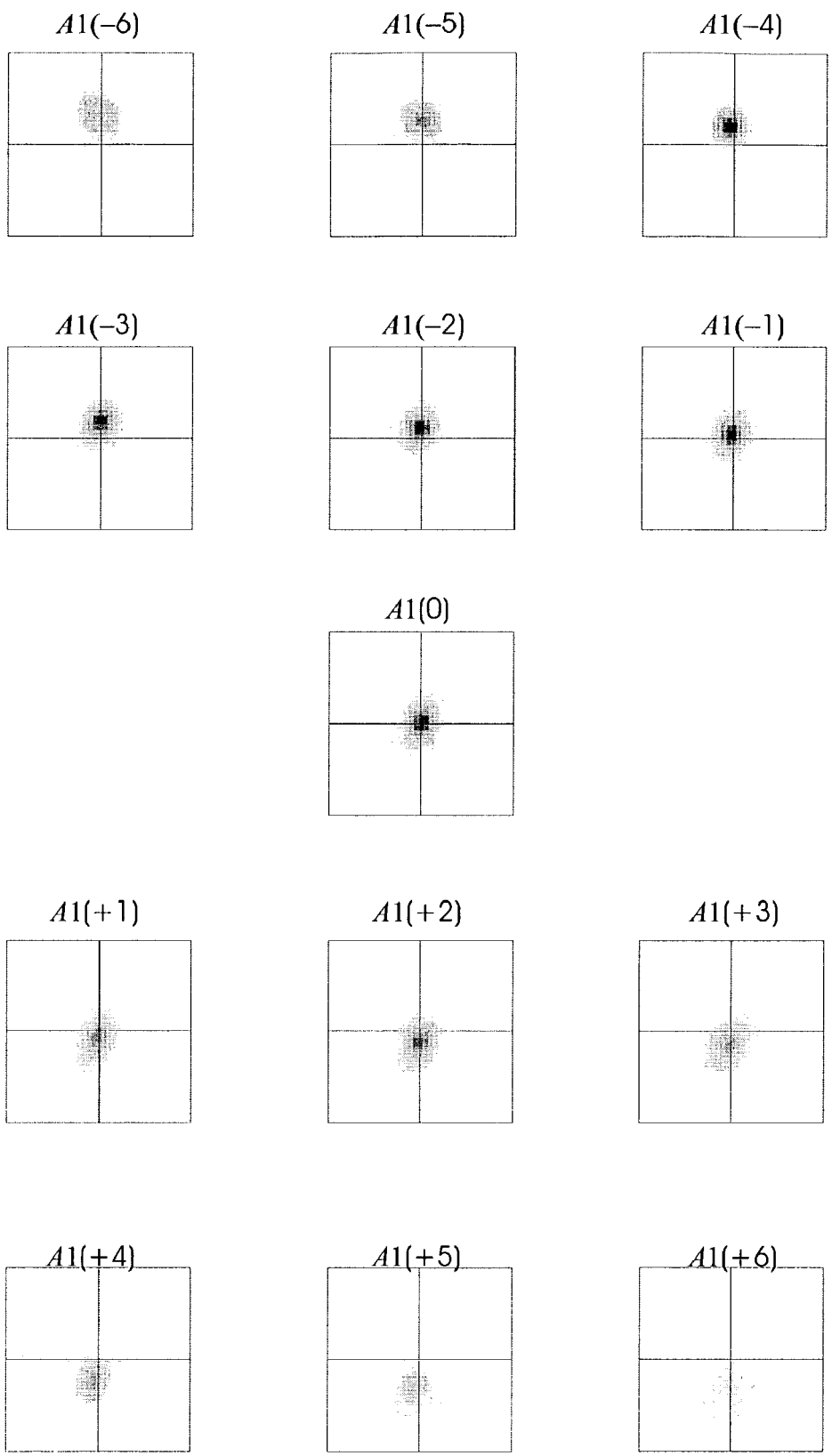
FIG. 13 shows the correlation of $S_{PSF}(x,y,0)$ with $S_{PSF}(x,y,nz')$.
Figure 14:
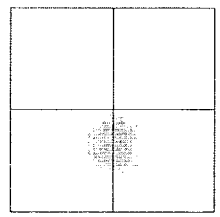
FIG. 14 shows the correlation of $N_{PSF}(x,y,0)$ with $N_{PSF}(x,y,nz')$.
Figure 14:
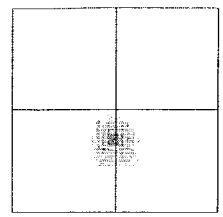
Figure 14:
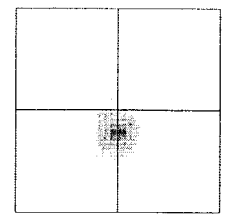
Figure 14:
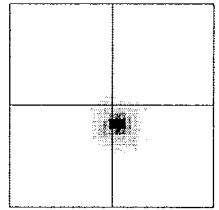
Figure 14:
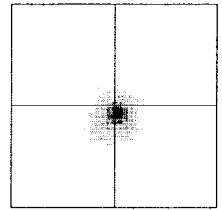
Figure 14:
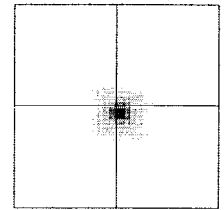
Figure 14:
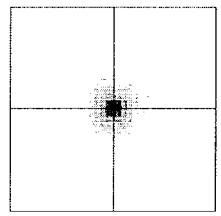
Figure 14:
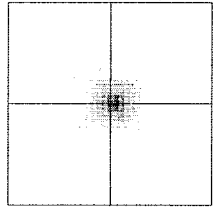
Figure 14:
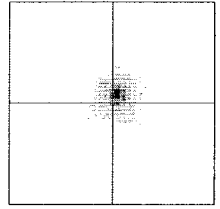
Figure 14:
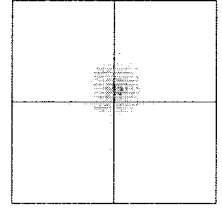
Figure 14:
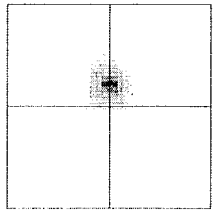
Figure 14:
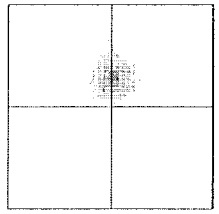
Figure 14:
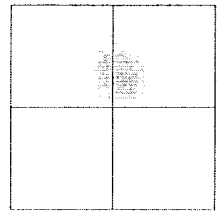
Figure 15:
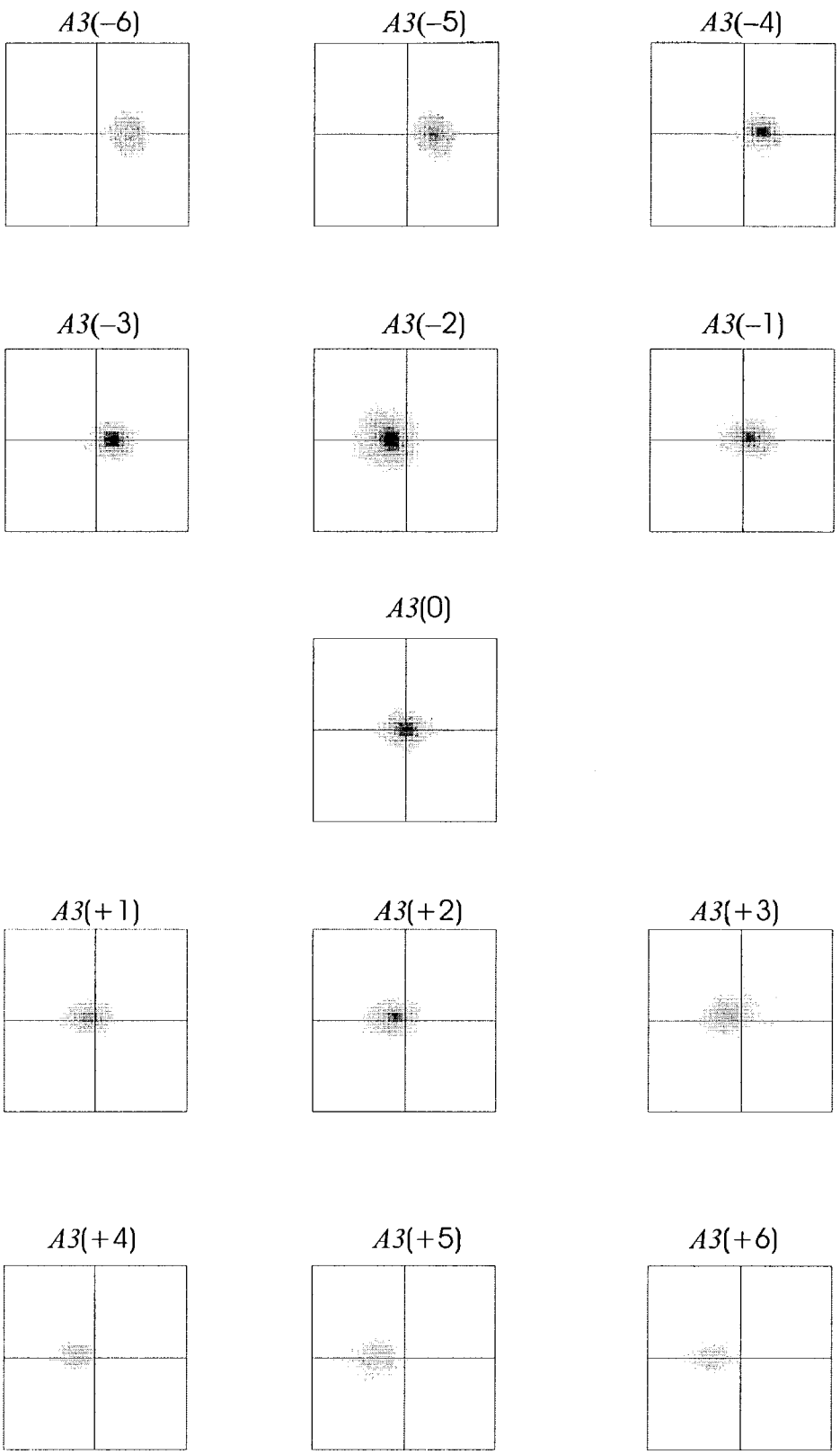
FIG. 15 shows the correlation of $W_{PSF}(x,y,0)$ with $W_{PSF}(x,y,nz')$.
Figure 16:
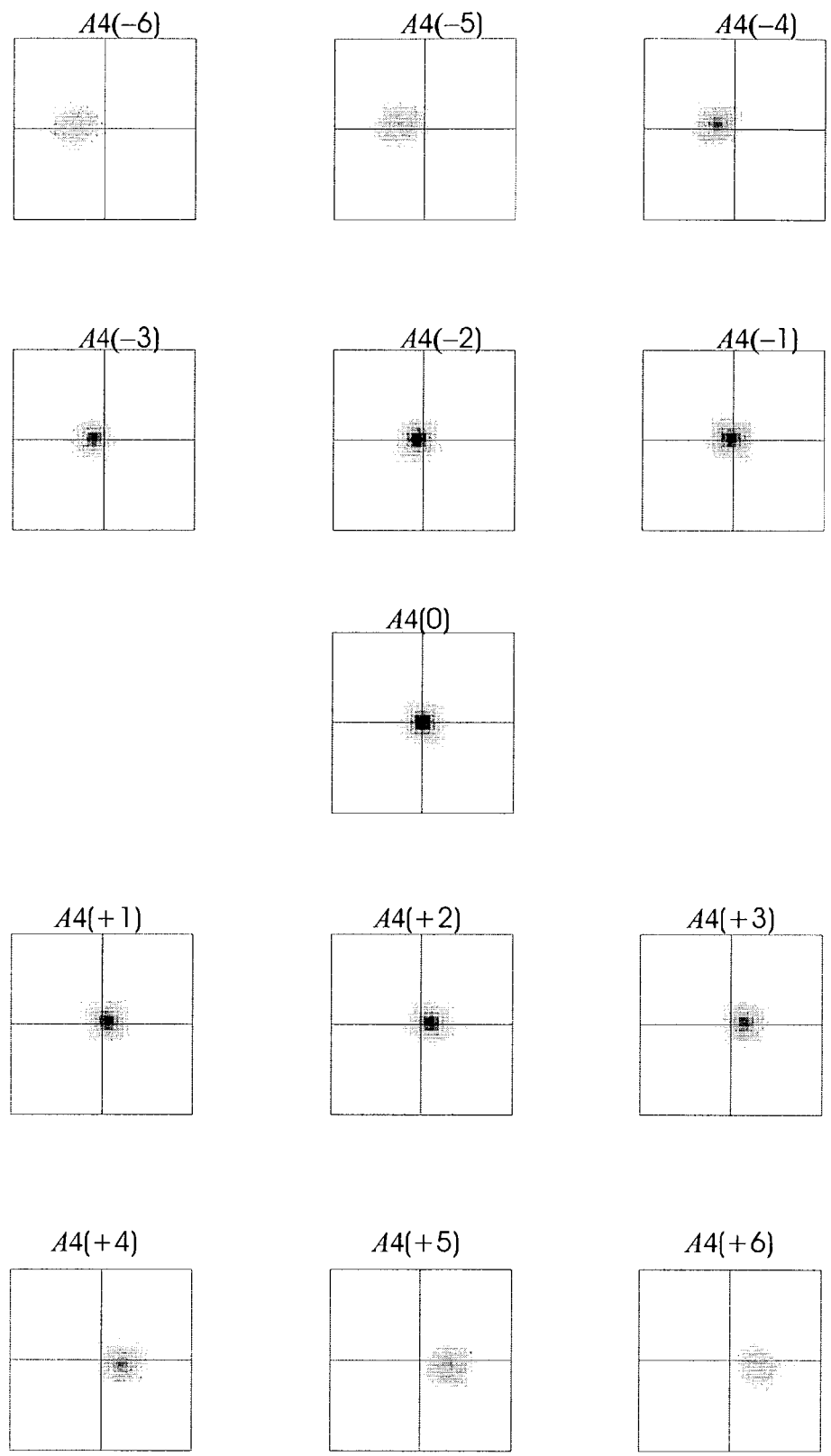
FIG. 16 shows the correlation of $E_{PSF}(x,y,0)$ with $E_{PSF}(x,y,nz')$.

The correlation is used to pick out the layer of the object. There are many ways to accomplish this. The example described in this section is based on a non-linear method by multiplying A1(m',n',−5,nz'), A2(m',n',−5,nz'), A3(m',n',−5,nz') and A4(m',n',−5,nz'). The product of A1(m',n',−5,−5), A2(m',n',−5,−5), A3(m',n',−5,−5) and A4(m',n',−5,−5) becomes the big the object layer. The result is shown in FIG. 12 for all layers of nz. As shown, nz=−5 layer is the dominant, and layering information can be obtained by this process.

The object in the nz=−5 layer is obtained by multiplying CS(x,y,−5), CN(x,y,−5), CW(x,y,−5) and CE(x,y,−5), and they are written as:

$$CS(x, y, -5) = \int_{m'} dm' \int_{n'} dn' \int_{nz' \neq -5} dnz' \, \text{Object}(m' + x, n' + y, nz') A1(m', n', -5, -nz') + \int_{m'} dm' \int_{n'} dn' \, \text{Object}(m' + x, n' + y, nz') A1(m', n', -5, -5), \quad (28)$$

$$CN(x, y, -5) = \int_{m'} dm' \int_{n'} dn' \int_{nz' \neq -5} dnz' \, \text{Object}(m' + x, n' + y, nz') A2(m', n', -5, -nz') + \int_{m'} dm' \int_{n'} dn' \, \text{Object}(m' + x, n' + y, nz') A2(m', n', -5, -5), \quad (29)$$

$$CW(x, y, -5) = \int_{m'} dm' \int_{n'} dn' \int_{nz' \neq -5} dnz' \, \text{Object}(m' + x, n' + y, nz') A3(m', n', -5, -nz') + \int_{m'} dm' \int_{n'} dn' \, \text{Object}(m' + x, n' + y, nz') A3(m', n', -5, -5), \quad (30)$$

$$CE(x, y, -5) = \int_{m'} dm' \int_{n'} dn' \int_{nz' \neq -5} dnz' \, \text{Object}(m' + x, n' + y, nz') A4(m', n', -5, -nz') + \int_{m'} dm' \int_{n'} dn' \, \text{Object}(m' + x, n' + y, nz') A4(m', n', -5, -5). \quad (31)$$

Then the product produces the layered image for the nz=−5 layer.

$$\text{layering\_image}(x, y, -5) = \quad (32)$$
$$CS(x, y, -5) \cdot CN(x, y, -5) \cdot CW(x, y, -5) \cdot CE(x, y, -5) \, \text{layering\_image}(x, y, -5) =$$

$$\begin{aligned}
&\left[ \int_{m'} dm' \int_{n'} dn' \int_{nz' \neq -5} dnz' \, \text{Object}(m' + x, n' + y, nz') A1(m', n', -5, -nz') + \right. \\
&\left. \int_{m'} dm' \int_{n'} dn' \, \text{Object}(m' + x, n' + y, nz') A1(m', n', -5, -5) \right] \cdot \\
&\left[ \int_{m'} dm' \int_{n'} dn' \int_{nz' \neq -5} dnz' \, \text{Object}(m' + x, n' + y, nz') A2(m', n', -5, -nz') + \right. \\
&\left. \int_{m'} dm' \int_{n'} dn' \, \text{Object}(m' + x, n' + y, nz') A2(m', n', -5, -5) \right] \cdot \\
&\left[ \int_{m'} dm' \int_{n'} dn' \int_{nz' \neq -5} dnz' \, \text{Object}(m' + x, n' + y, nz') A3(m', n', -5, -nz') + \right. \\
&\left. \int_{m'} dm' \int_{n'} dn' \, \text{Object}(m' + x, n' + y, nz') A3(m', n', -5, -5) \right] \cdot \\
&\left[ \int_{m'} dm' \int_{n'} dn' \int_{nz' \neq -5} dnz' \, \text{Object}(m' + x, n' + y, nz') A4(m', n', -5, -nz') + \right. \\
&\left. \int_{m'} dm' \int_{n'} dn' \, \text{Object}(m' + x, n' + y, nz') A4(m', n', -5, -5) \right] \approx
\end{aligned} \quad (33)$$

-continued $$\left[\int_{m'} dm' \int_{n'} dn' \ \text{Object}(m'+x, n'+y, nz') A1(m', n', -5, -5)\right]\cdot$$

$$\left[\int_{m'} dm' \int_{n'} dn' \ \text{Object}(m'+x, n'+y, nz') A2(m', n', -5, -5)\right]\cdot$$

$$\left[\int_{m'} dm' \int_{n'} dn' \ \text{Object}(m'+x, n'+y, nz') A3(m', n', -5, -5)\right]\cdot \quad (34)$$

$$\left[\int_{m'} dm' \int_{n'} dn' \ \text{Object}(m'+x, n'+y, nz') A4(m', n', -5, -5)\right]\cdot$$

FIG. 12, shows that if $nz \neq -5$, the multiplication will be relatively small compare to the multiplication of $nz=-5$. The features at $-5$ layer are then picked out.

The general equation for all layering images is $$\text{layering\_image}(x,y,nz) = CS(x,y,nz) \cdot CN(x,y,nz) \cdot CW(x,y,nz) \cdot CE(x,y,nz), \quad (35)$$

where $nz=-N,-(N-1),\ldots,-2,-1,0,+1,+2,\ldots,+(N-1),+N$.

In order to calibrate the intensities of layering images, layering images is normalized to the centered image. For each pixel, the total intensity of all layers should be equal to the intensity of that pixel in the centered image $$\int_{-N}^{+N} \text{layering\_image}(x, y, nz) dnz = C(x, y). \quad (36)$$

Figure 17:
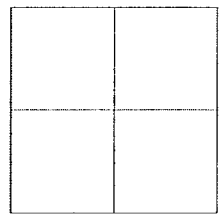
FIG. 17 shows a set of layering images by non-Linear method for n=0.
Figure 17:
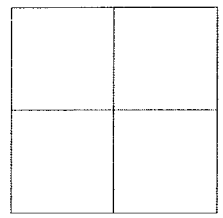
Figure 17:
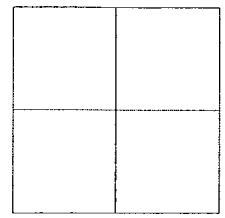
Figure 17:
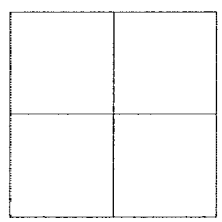
Figure 17:
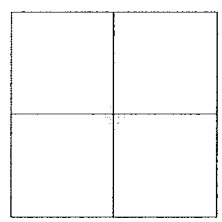
Figure 17:
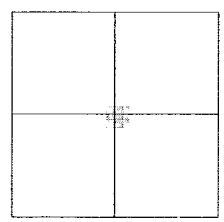
Figure 17:
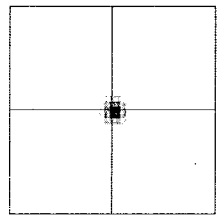
Figure 17:
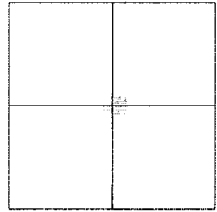
Figure 17:
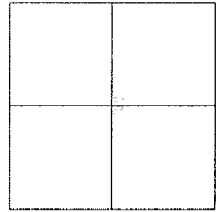
Figure 17:
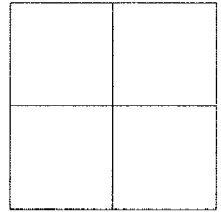
Figure 17:
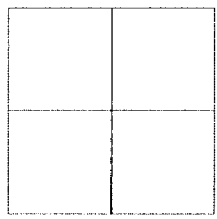
Figure 17:
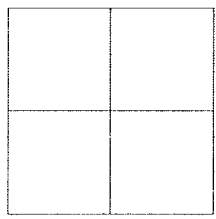
Figure 17:
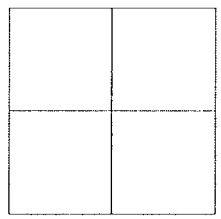
Figure 18:
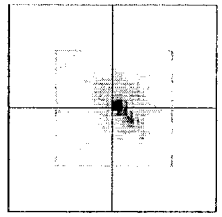
FIG. 18 shows a set of layering images for n=-6.
Figure 18:
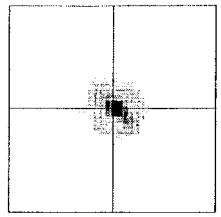
Figure 18:
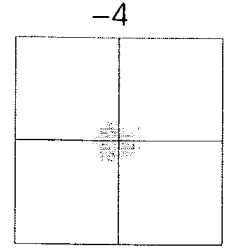
Figure 18:
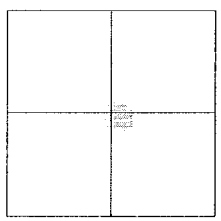
Figure 18:
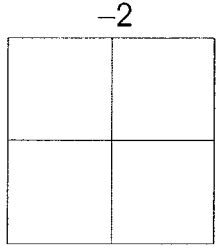
Figure 18:
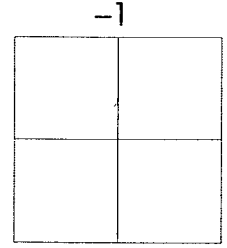
Figure 18:
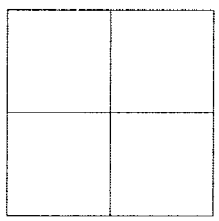
Figure 18:
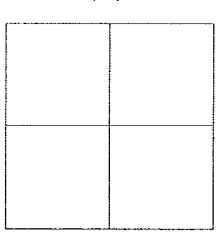
Figure 18:
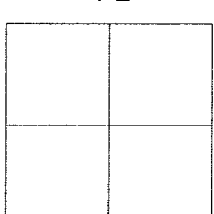
Figure 18:
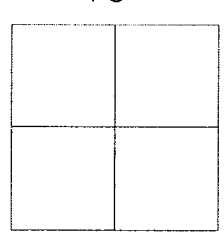
Figure 18:
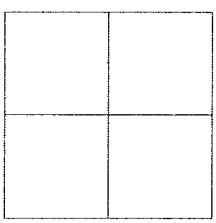
Figure 18:
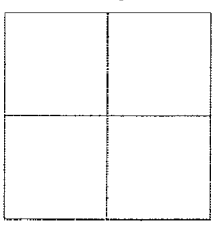
Figure 18:
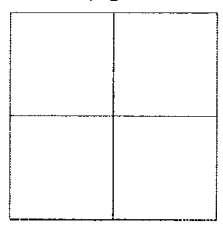
Figure 19:
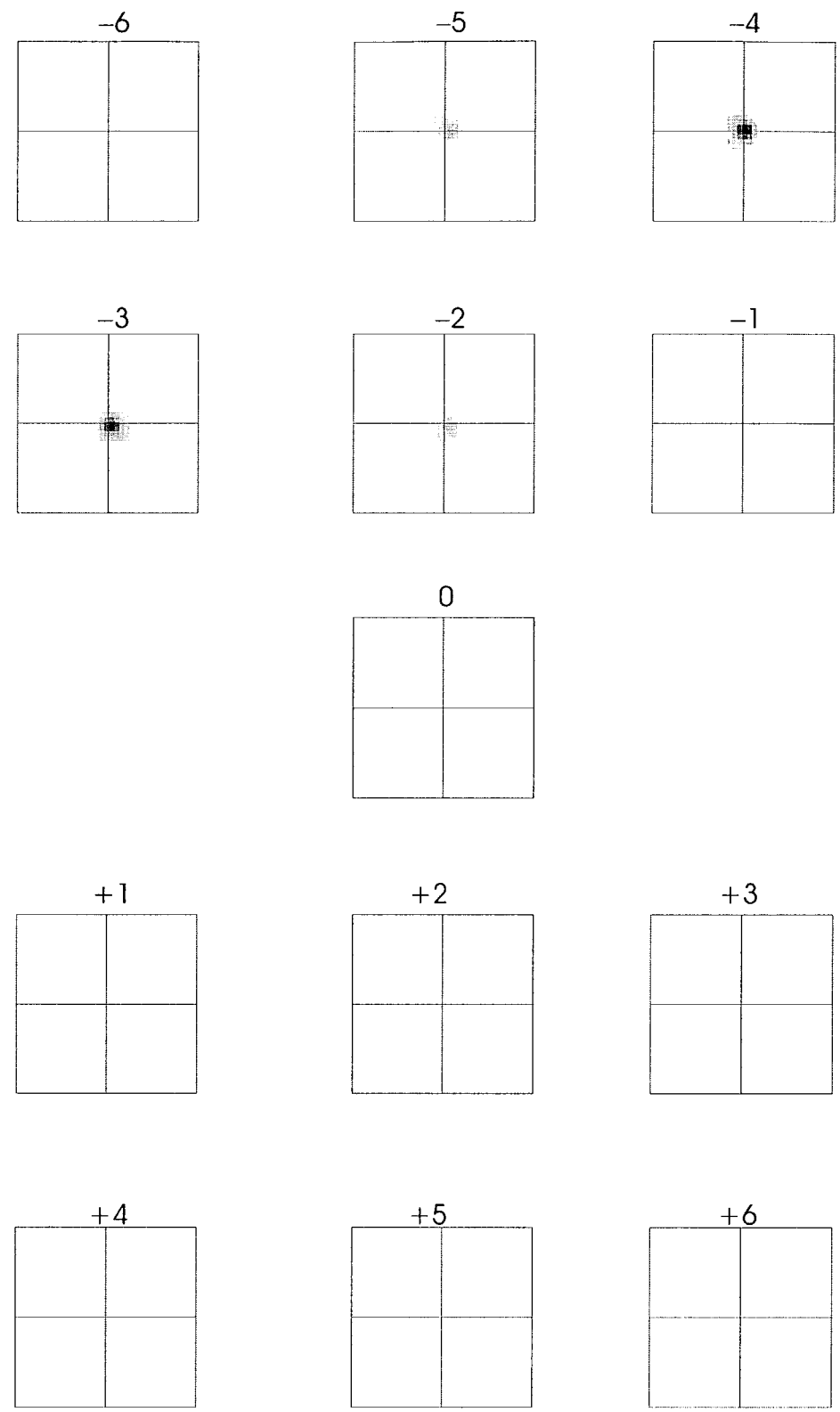
FIG. 19 shows a set of layering images for n=-4.
Figure 20:
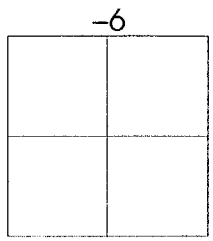
FIG. 20 shows a set of layering images for n=-3.
Figure 20:
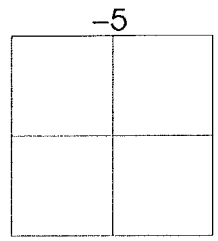
Figure 20:
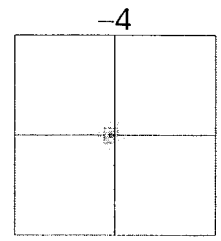
Figure 20:
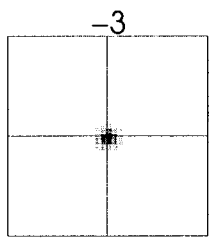
Figure 20:
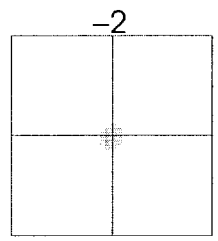
Figure 20:
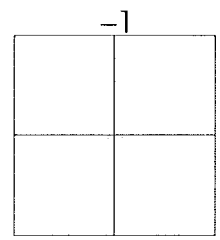
Figure 20:
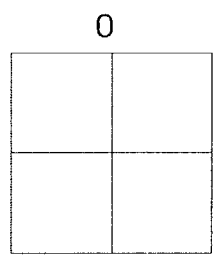
Figure 20:
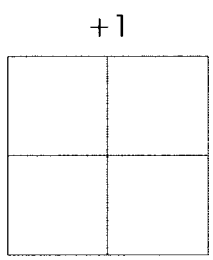
Figure 20:
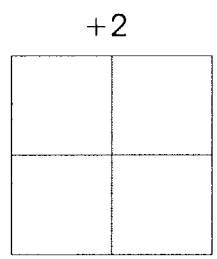
Figure 20:
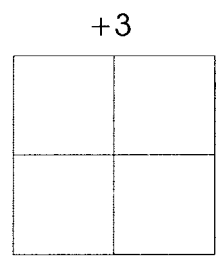
Figure 20:
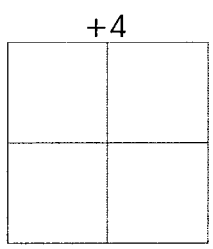
Figure 20:
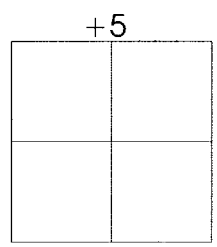
Figure 20:
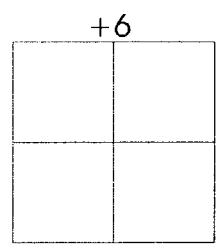
Figure 21:
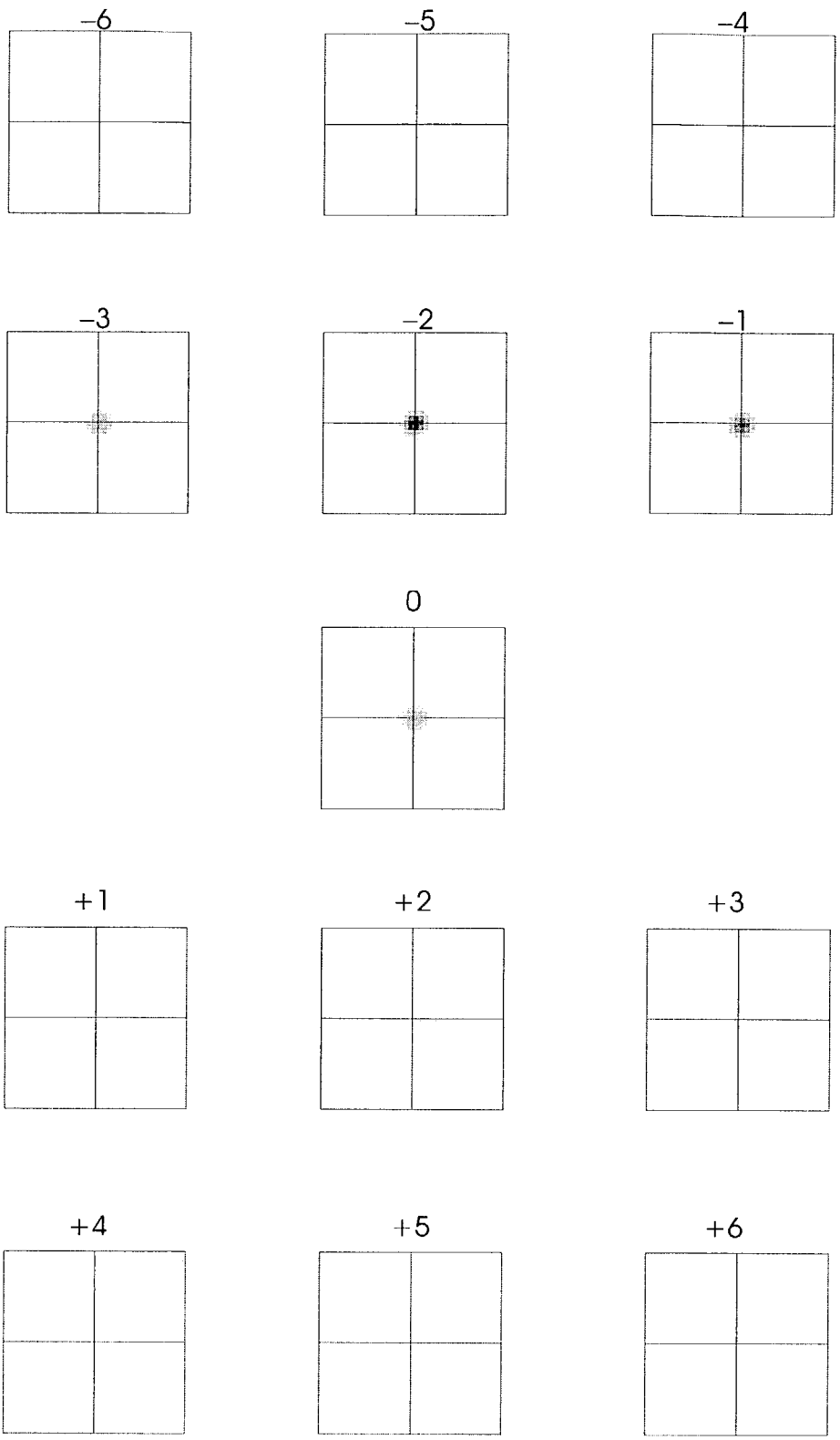
FIG. 21 shows a set of layering images for n=-2.
Figure 22:
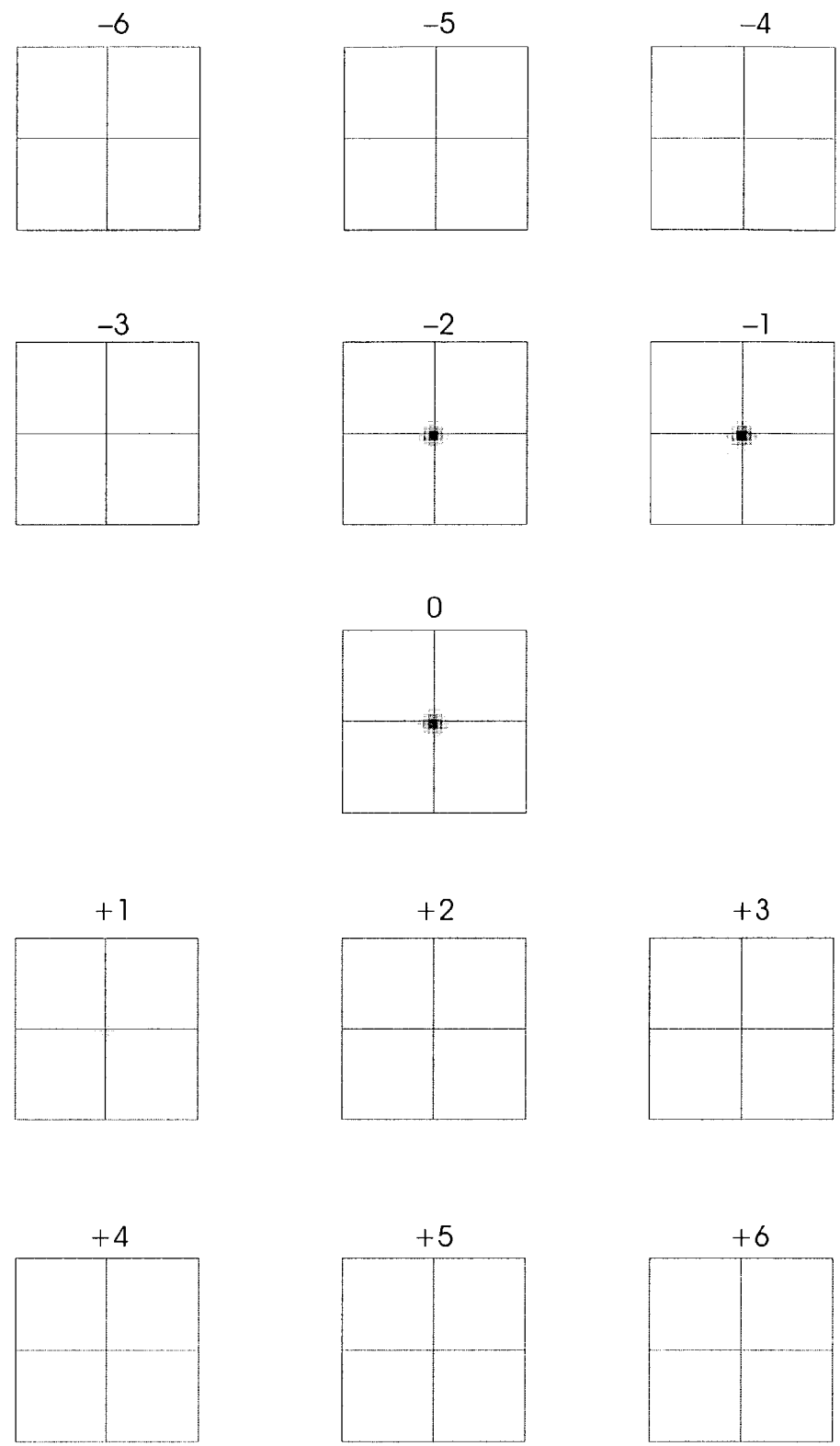
FIG. 22 shows a set of layering images for n=-1.
Figure 23:
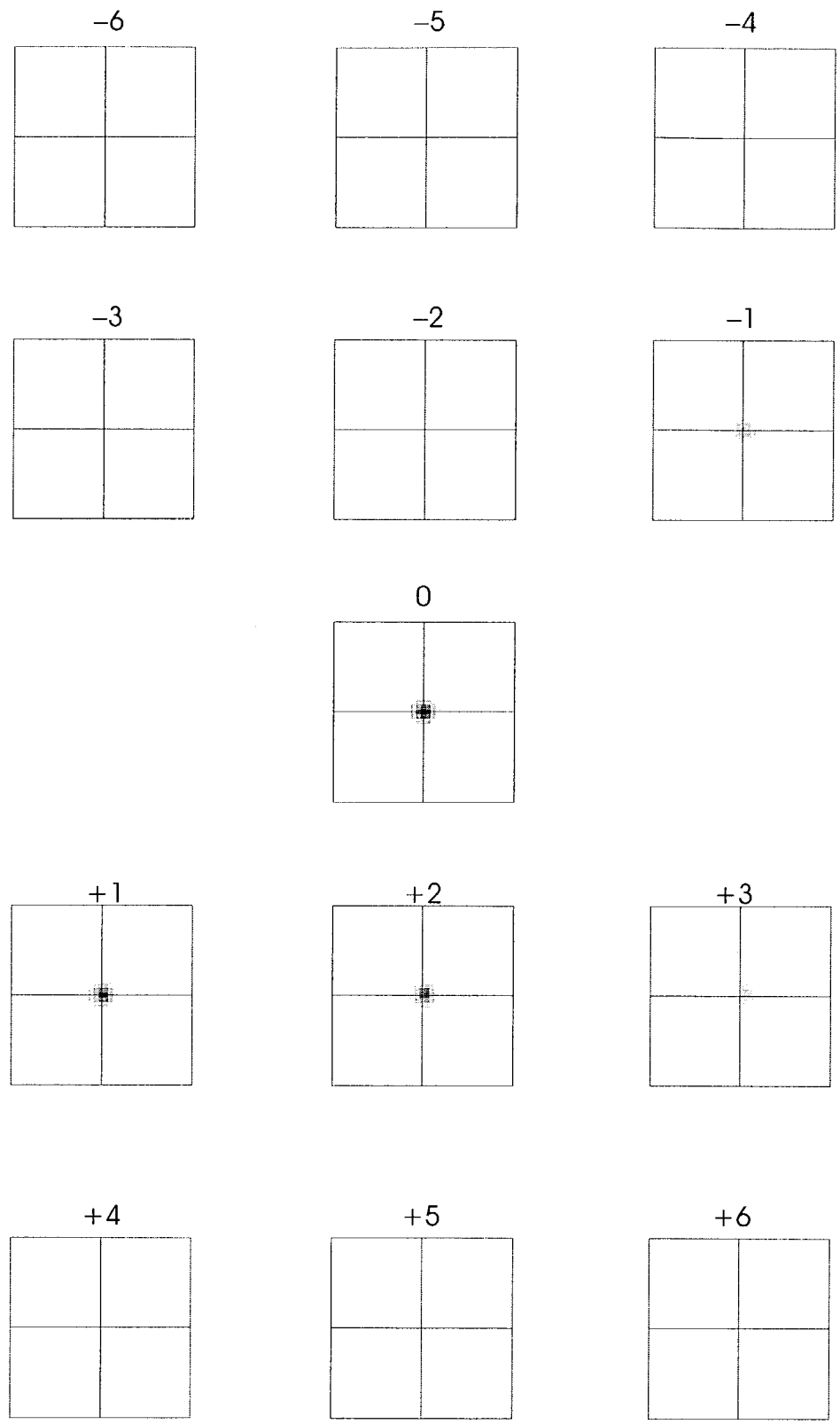
FIG. 23 shows a set of layering images for n=+1.
Figure 24:
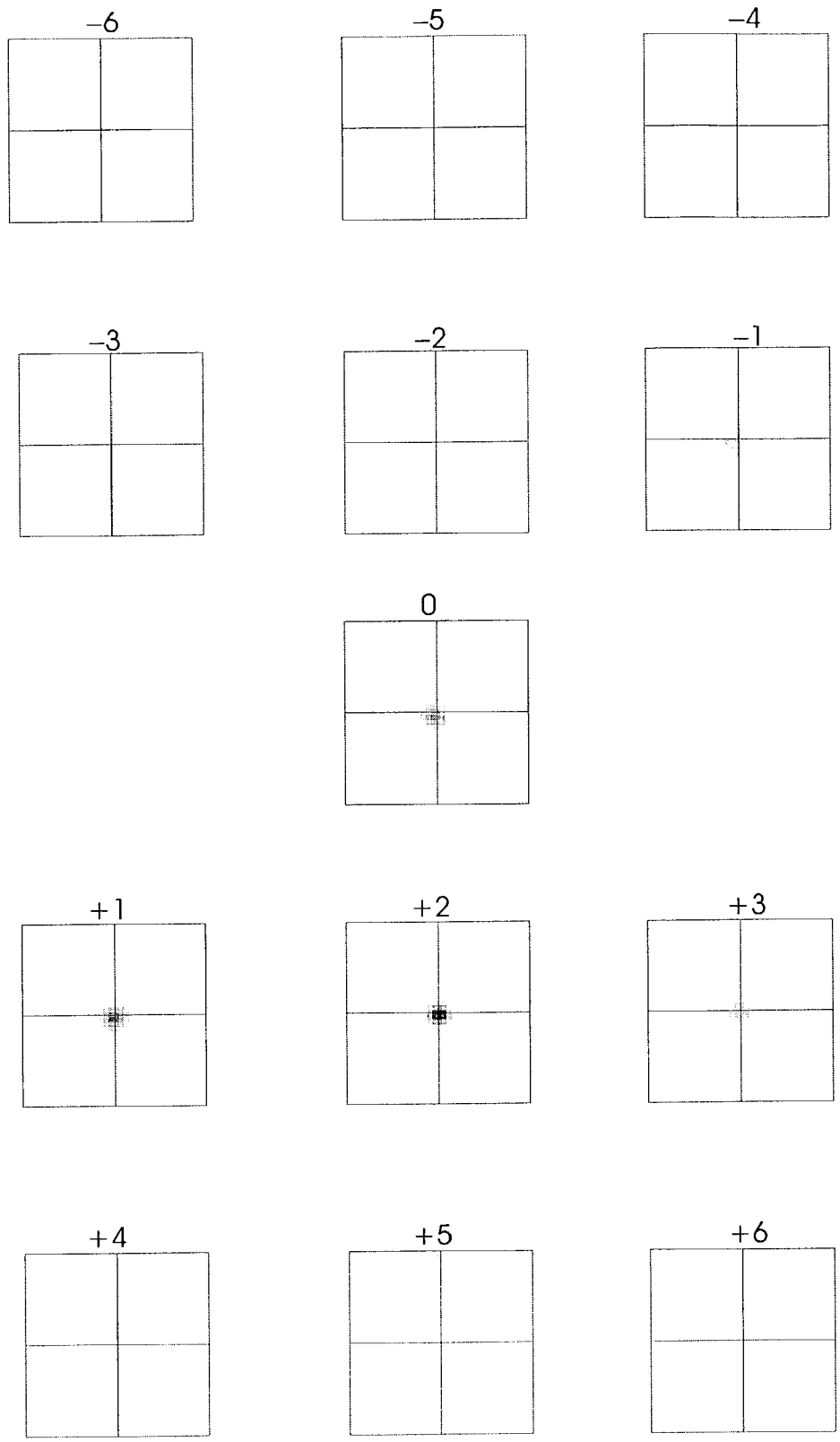
FIG. 24 shows a set of layering images for n=+2.
Figure 25:
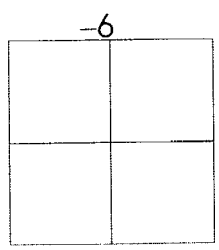
FIG. 25 shows a set of layering images for n=+3.
Figure 25:
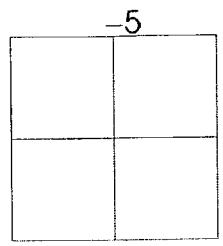
Figure 25:
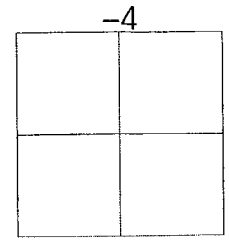
Figure 25:
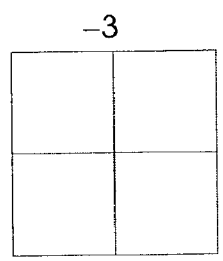
Figure 25:
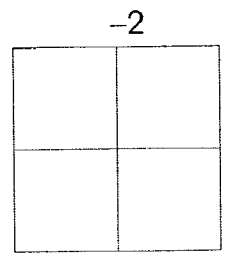
Figure 25:
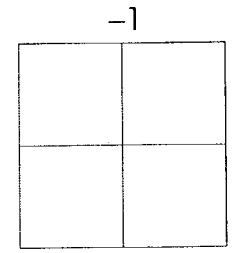
Figure 25:
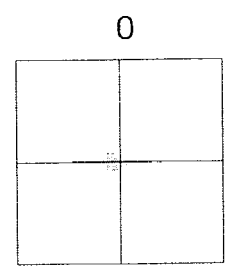
Figure 25:
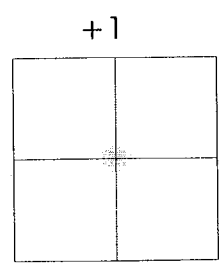
Figure 25:
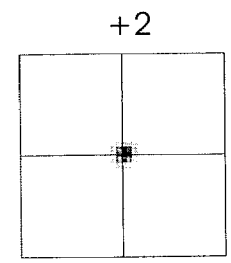
Figure 25:
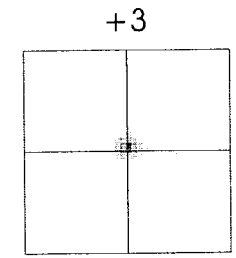
Figure 25:
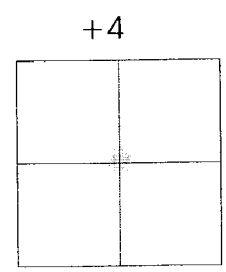
Figure 25:
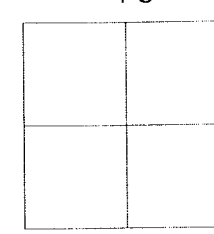
Figure 25:
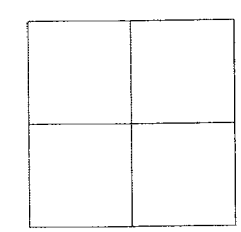
Figure 26:
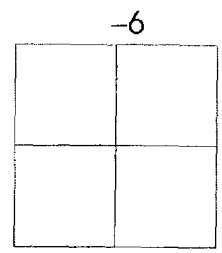
FIG. 26 shows a set of layering images for n=+4.
Figure 26:
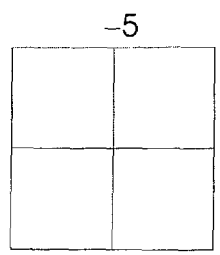
Figure 26:
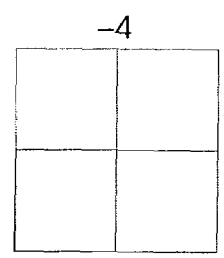
Figure 26:
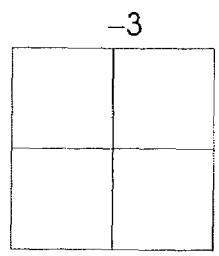
Figure 26:
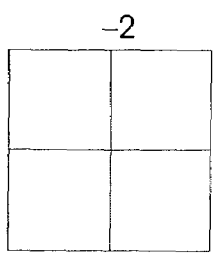
Figure 26:
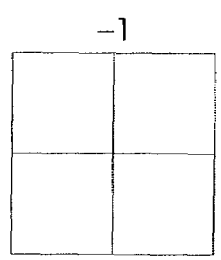
Figure 26:
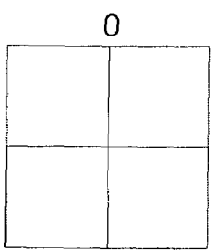
Figure 26:
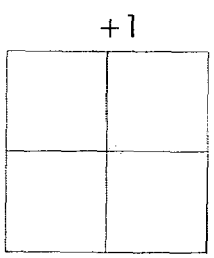
Figure 26:
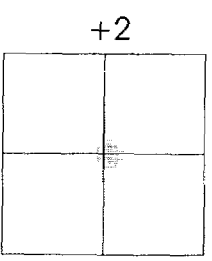
Figure 26:
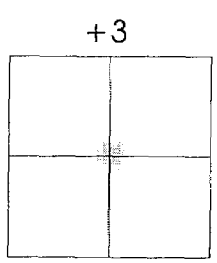
Figure 26:
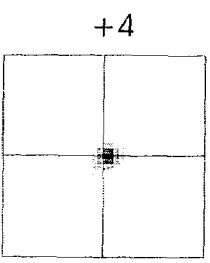
Figure 26:
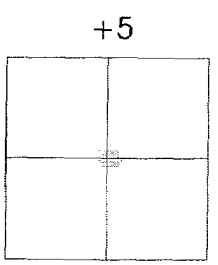
Figure 26:
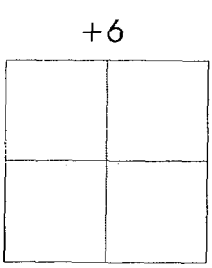
Figure 27:
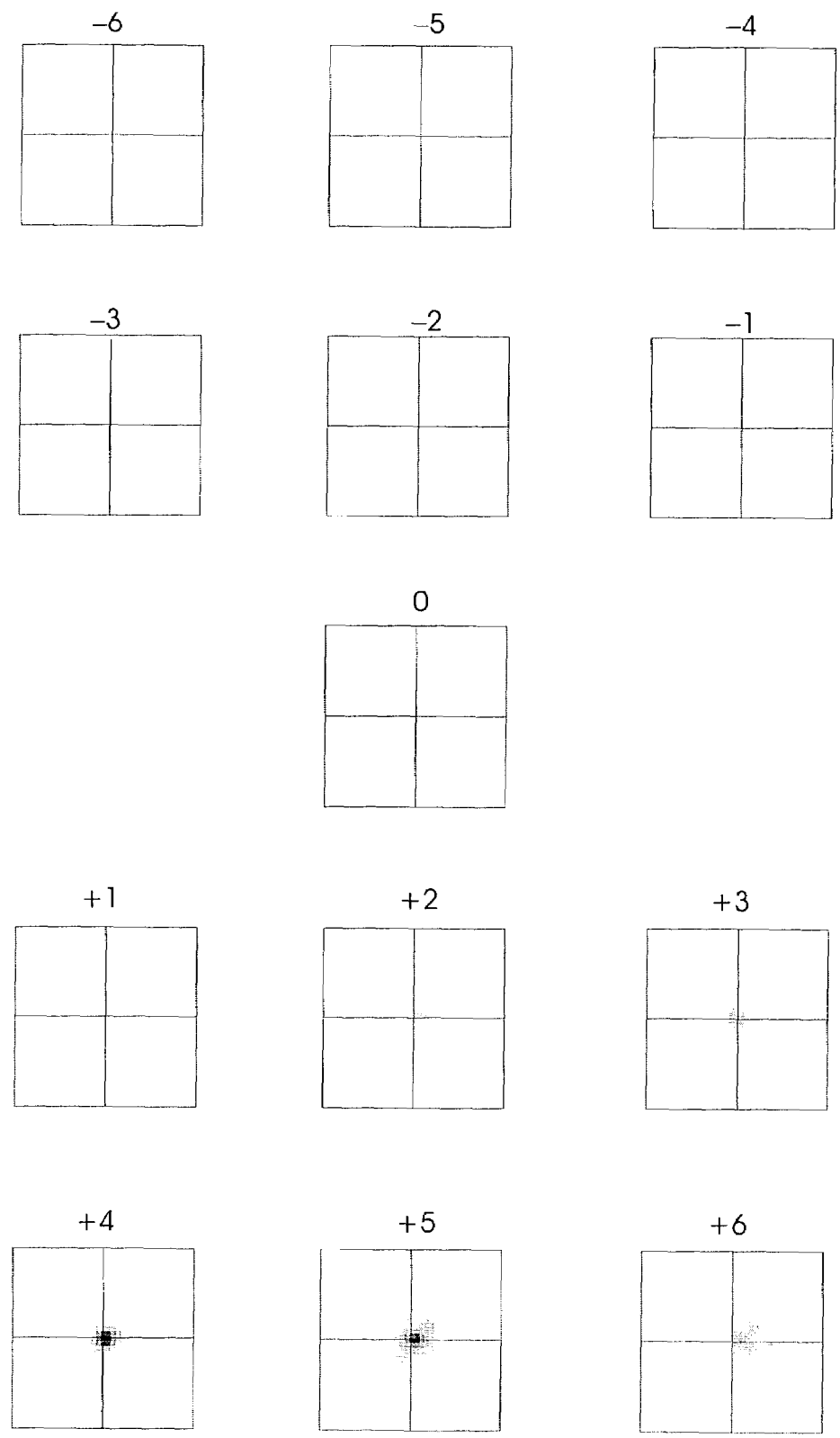
FIG. 27 shows a set of layering images for n=+5.
Figure 28:
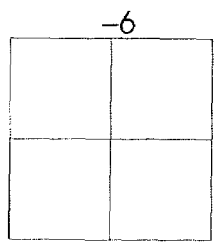
FIG. 28 shows a set of layering images for n=+6.
Figure 28:
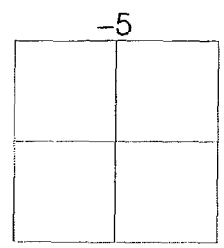
Figure 28:
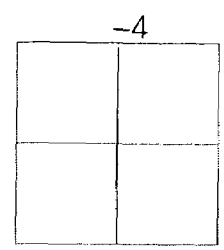
Figure 28:
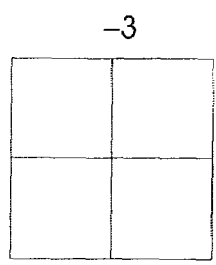
Figure 28:
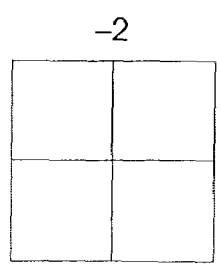
Figure 28:
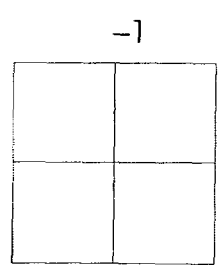
Figure 28:
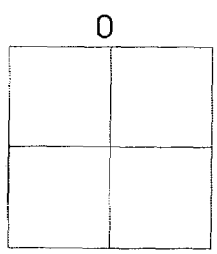
Figure 28:
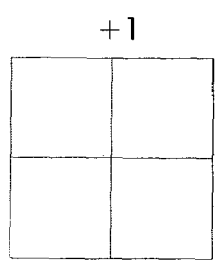
Figure 28:
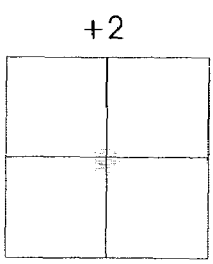
Figure 28:
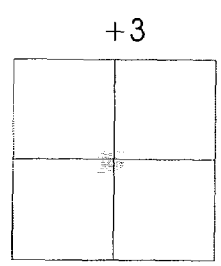
Figure 28:
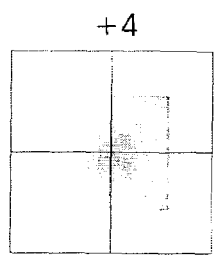
Figure 28:
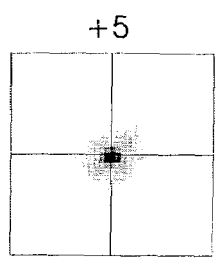
Figure 28:
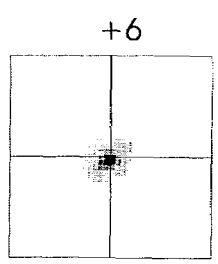

FIGS. 13 to 16 show the correlation of $S_{PSF}(x,y,0)$ with $S_{PSF}(x,y,nz')$, $N_{PSF}(x,y,0)$ with $N_{PSF}(x,y,nz')$, $W_{PSF}(x,y,0)$ with $W_{PSF}(x,y,nz')$, $E_{PSF}(x,y,0)$ with $E_{PSF}(x,y,nz')$, respectively. FIG. 17 shows the correlation of layering images for $n=0$ layer. FIGS. 18 to 28 show the layering images for $nz=-6,-4,-3,-2,-1,+1,+2,+3,+4,+5,+6$ layers, respectively. This illustrates the concept of the algorithm is effective for optical sectioning. Some of the results in FIGS. 18 to 28 are not perfect because the PSF are taken from micro-bead images, and the bead that is chosen for some layers may not be located exactly at that layer. This problem can be improved by two methods:

(a) Obtain images of more fluorescent beads distributed at more z positions so that beads can be found to be located closer to the desirable z locations; and/or (b) Obtain more images of the same group of beads, but move the focus up and down by the amount of sectioning intervals.

C. Deconvolution

After optical sectioning, the layered images are out of focus. Information of the PSF can be used to sharpen the images. The technique is called deconvolution. The symbols used for the mathematical equations are defined in Table 4.

TABLE 4

| Variable | Description |
|---|---|
| layering_image(x, y, nz)<br>nz = −N, −(N − 1), ..., −2, −1, 0, +1, +2, ...,<br>+(N − 1), +N | Optical sectioning images |

TABLE 4-continued

| Variable | Description |
|---|---|
| Object(x, y, nz)<br>nz = −N, −(N − 1), ..., −2, −1, 0, +1, +2, ...,<br>+(N − 1), +N | Real object to be reconstructed |
| Object$^{(k)}$(x, y, nz)<br>nz = −N, −(N − 1), ..., −2, −1, 0, +1, +2, ...,<br>+(N − 1), +N | k$^{th}$ guess of object |

Centered image is the convolution of object and centered point-spread functions, and it is focused at $n=0$ plane.

$$C(x, y) = \quad (37)$$

$$\text{Object}(x, y, nz') \otimes C_{PSF}(x, y, nz') = \int_0^X \int_0^Y \int_{-N}^{+N} \text{Object}(x, y, nz') \cdot C_{PSF}(x-x', y-y', -nz') dx' dy' dnz'.$$

The image is within the area of $0 \leq x \leq X$ and $0 \leq y \leq Y$. From equation (36), centered image is summation of layering images.

$$C(x, y) = \int_{-N}^{+N} \text{layering\_image}(x, y, nz') dnz'. \quad (38)$$

Then (38) can be written as, $$\int_{-N}^{+N} \text{layering\_image}(x, y, nz') dnz' = \quad (39)$$

$$\int_0^X \int_0^Y \int_{-N}^{+N} \text{Object}(x', y', nz') \cdot C_{PSF}(x-x', y-y', -nz') dx' dy' dnz'.$$

Multiple both sides with a delta function, $$\delta(nz' - nz) = \begin{cases} 1 & nz' = nz, \\ 0 & nz' \neq nz. \end{cases} \quad (40)$$

Equation (39) becomes:

$$\text{layering\_image}(x, y, nz) = \int_0^X \int_0^Y \text{Object}(x', y', nz) \cdot C_{PSF}(x-x', y-y', -nz) dx' dy' \quad (41)$$
$$= \text{Object}(x, y, nz) \otimes C_{PSF}(x, y, nz).$$

Equation (41) is the essence of this 3D image reconstruction algorithm embodiment, i.e., that at each nz layer, layering_image(x,y,nz) is only the convolution of that layer's object and that layer's PSF, not coupled to other layers. That deconvolution can be done in 2D, not coupled 3D, greatly simplifying the deconvolution procedure.

There are many deconvolution methods known in the art. Gold's method is used in this explanation. See R. Gold, *An iterative unfolding method for response matrices*, Report No. ANL-6984 (Argonne Nat'l Lab., Argonne, Ill., 1964).

The algorithm starts with a guess for the 3D object. The layering_image is used for the initial guess.

$$\text{object}^{(1)}(x,y,nz) = \text{layering\_image}(x,y,nz), \quad (42)$$

where $nz = -N, -(N-1), \ldots, -2, -1, 0, +1, +2, \ldots, +(n-1), +N$.

Approximate solution is to be obtained by iteration. For Gold's method, the equation to be iterated is:

$$\text{object}^{(k+1)}(x, y, nz) = \text{object}^{(k)}(x, y, nz) \cdot \frac{\text{layering\_image}(x, y, nz)}{\text{object}^{(k)}(x, y, nz) \otimes C_{PSF}(nz)}, \quad (43)$$

where $nz = -N, -(N-1), \ldots, -2, -1, 0, +1, +2, \ldots, +(n-1), +N$ and '⊗' designates convolution.

Constrains are imposed to keep the solution real. Values of all elements of the images are kept as non-negative. The total intensity of each layer are kept the same in each iteration, i.e., $$\sum_x \sum_y \text{object}^{(k)}(x, y, nz) = \sum_x \sum_y \text{layering\_image}(x, y, nz), \quad (44)$$

where $nz = -N, -(N-1), \ldots, -2, -1, 0, +1, +2, \ldots, +(n-1), +N$.

Error is calculated based on standard deviation.

$$\text{error} = \frac{\sqrt{\sum_x \sum_y (\text{object}^{(k+1)}(x, y, nz) - \text{object}^{(k)}(x, y, nz))^2}}{\sum_x \sum_y |\text{object}^{(k)}(x, y, nz)|}. \quad (45)$$

The iterations terminate after the error becomes smaller than a pre-specified value. When the value is set appropriately, the blurred image of the object can be sharpened significantly after deconvolution.

D. 3D Image Display

The sharpened, deconvolved images will be used for display. One method of displaying 3D object in a 2D image is to use false color by the use of different colors for different layers. There are many varieties for color coding. The following is a color-coding example for a 13-layer object. For example, one direction is in red, the opposite in green, and color is changed in between. The image background may be coded in blue. The color coding can be changed to what is desired by the user. Table 5 shows an example of assigning the color.

TABLE 5

| | Color-Coding | | |
|---|---|---|---|
| Layer No. | Red weight | Green weight | Color |
| −6 | 1 | 0 | totally red |
| −5 | 11/12 | 1/12 | |
| −4 | 10/12 | 2/12 | |
| −3 | 9/12 | 3/12 | yellowish red |
| −2 | 8/12 | 4/12 | |
| −1 | 7/12 | 5/12 | |
| 0 | 6/12 | 6/12 | yellow |
| +1 | 5/12 | 7/12 | |
| +2 | 4/12 | 8/12 | |
| +3 | 3/12 | 9/12 | yellowish green |
| +4 | 2/12 | 10/12 | |
| +5 | 1/12 | 11/12 | |
| +6 | 0 | 1 | totally green |

Figure 29:
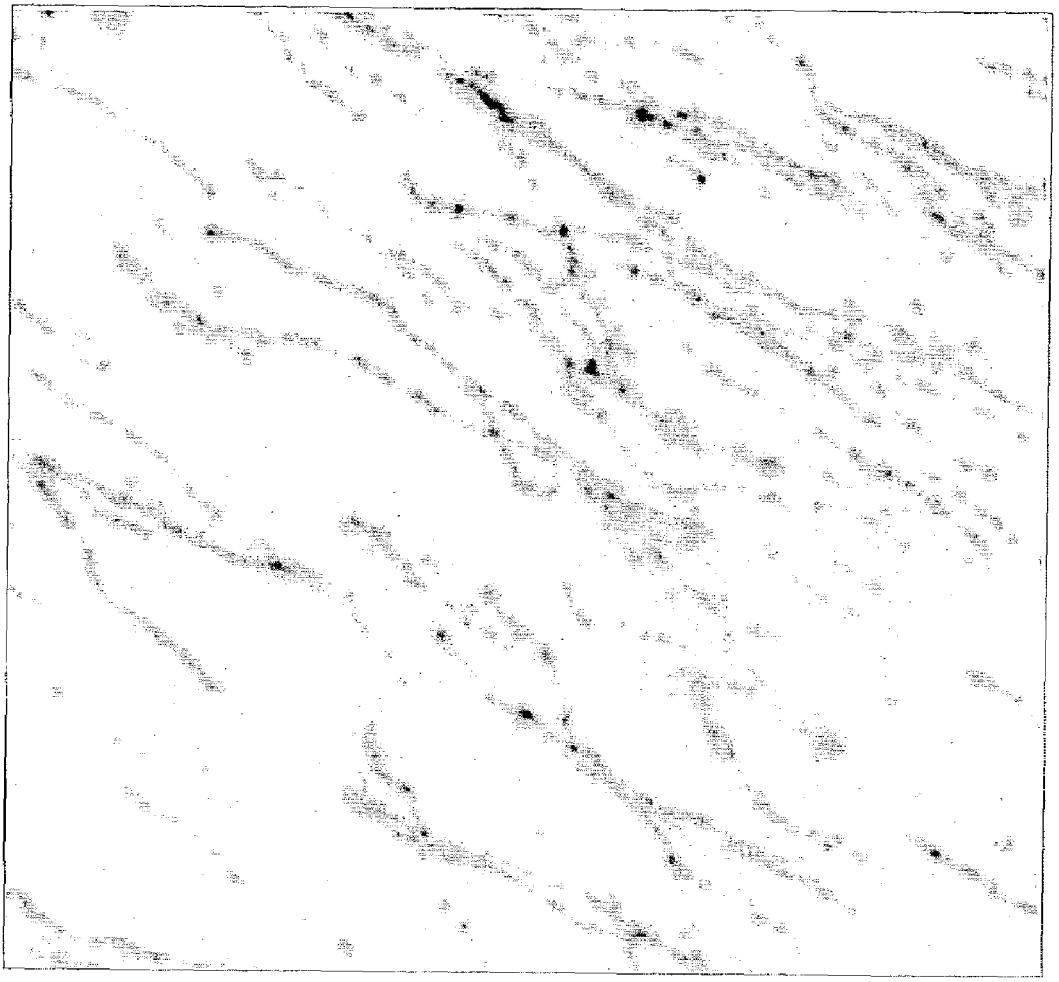
FIG. 29 is an example of applying the algorithm on neuron images, showing: (a) the original centered neuron image; (b) a color image coded with red and green against a blue background; and (c) another color image coded with red and green against a white background.
Figure 29:
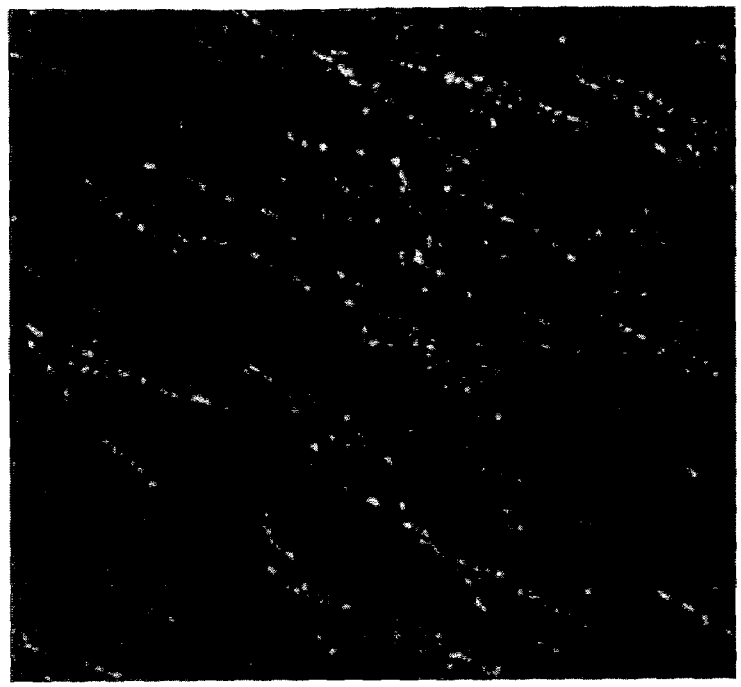
Figure 29:
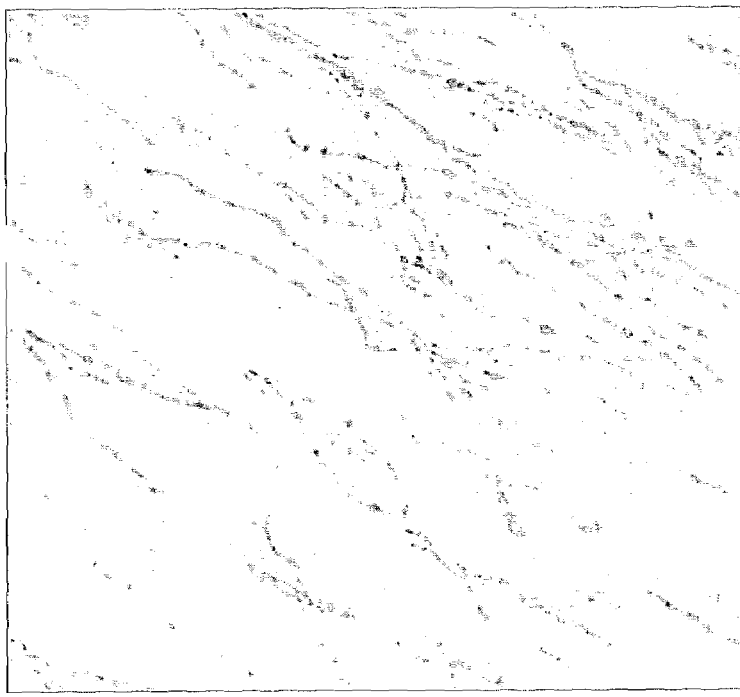

This algorithm is applied to a set of neuron images. FIG. 29 shows (a) the original centered neuron image, (b) the color image coded as above, and (c) another color image coded with red and green against a white background.

II. Examples of Variations of the Invention

Many variations of the present invention may be practiced by those of ordinary skill in the art in light of the present specification. Hence, the invention herein is not limited to any examples, which are provided to illustrate the principles of the invention and are not intended to be limiting.

A. Directional Images

The minimum number of directional images is two. But two directional images might not be able to differentiate special line lattice structures in each 2D slice of the image. Three directional or four directional images with appropriate apertures are adequate for obtaining accurate layering.

Figure 30:
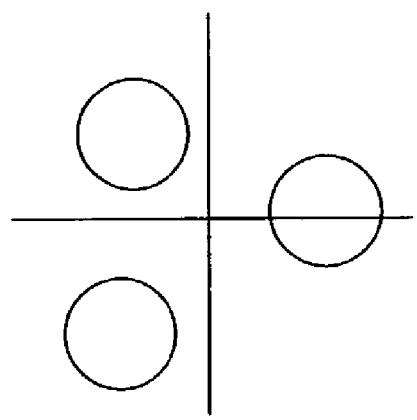
FIG. 30 shows an example of three directional images. The directional images can be roughly equally spaced relative to the centered image in the angular directions.
Figure 31:
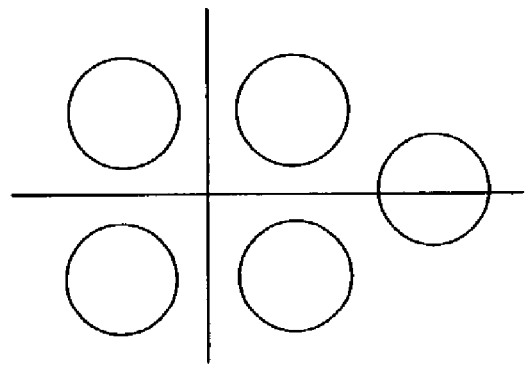
FIG. 31 shows an example of five directional images in which the directional images do not have to be equally spaced in the angular direction nor have the same radial distance from the axis.

The directional images do not have to be exactly equally spaced relative to the centered image in the angular directions. FIG. 30 shows an example of three directional apertures and FIG. 31 shows an example of five directional apertures. The use of four directional apertures do not have to be exactly due east, west, north or south and they do not have to have the same distance from the center axis. If other than four directional equally spaced directional apertures are used, the equations above will have to be modified accordingly.

B. Thickness of the 3D Object

The thickness of the object that this invention can be applied to is only limited by the thickness of the microscope slide that is allowable in the microscope. The thickness of the 3D object that can be obtained is not limited by the method, but by practical considerations such as the time that it takes to section the 3D image and deconvolution. The PSF becomes very large when the PSF is far from the focused layer. Large PSF takes much longer to section the 3D image and to perform deconvolution. It may be more efficient to take more than one set of images in the vertical direction for very thick objects. For example, if the thickness limit is 20 microns, one can change the focus of the microscope or move the microscope slide by 20 microns in the vertical direction and take another set of images. Within each 20 microns, the image acquisition and processing are very efficient. Repeated application of image acquisition can yield an image of very thick specimens.

The maximum thickness of the 3D object than can be obtained depends on the range the focal distance can be varied by the optical system. For microscope, it the maximum range of vertical distance allowed between the microscope focal planes. For telescope microscopes, the maximum thickness of the 3D object that can be obtained is again the maximum range of distance allowed between the microscope focal planes. For directional images acquired using different lens systems, such as using totally different camera, then the depth of the objects that can be obtained depends on the distance between cameras and the amount of image display within the field of the camera.

C. Variations of Layering Algorithms

The general equation for all layering images using four directional images is $$\text{layering\_image}(x, y, nz) = \left(\prod_{m=1}^{M} C_m(x, y, nz)\right)^p, \quad (46)$$

where $nz=-N,-(N-1),\ldots,-2,-1,0,+1,+2,\ldots,+(N-1),+N$ and the algorithm works when the number $p \geq 1$. The same concept applies for a different number of directional images, and the minimum number for directional images is $M=2$. Besides the multiplication method, other variations for layering, like adding the directional images together and other nonlinear formations to enhance the layer are applicable.

D. Variations of Deconvolution Algorithms

A variety of deconvolution algorithms can be used besides Gold's method described above. Deconvolution algorithms such as Richard-Lucy method, Schell's method, Jansson's method, and blind deconvolution method can all be applied.

E. Variations of Additional Imaging Processing for the Layered Images

Algorithms can be used to manipulate the processed images for special purposes, such as sharpen the boundaries of the objects, counting the number of objects, calculate the volume of the objects, etc.

F. Variations of Image Acquisition and Preprocessing

The image to be acquired can be fluorescent images where the background is black or bright field where the background is bright. Preprocessing is needed to correct defects that maybe present due to imperfect detector, to correct non-uniform illumination, to enhance images, etc. A number of preprocessing steps need to be performed before the application of the algorithms.

Elimination of Camera Defects: Sometimes, defects maybe present due to imperfect CCD camera. As a result, tiny black points will appear on images and they need to be removed.

Intensity Inversion: For bright field images, the intensity of the images has to be reversed before image processing because details of objects show up better on a black background.

Edge Enhancement: Edge enhancement has the effect of making edges easier for the viewers to see, consequently making the in-focus features appear sharper. For example, adding second derivative to the deconvolved image can further sharpen the image.

Background Leveling: Non-uniform illumination exists when directional images are taken with spatial filtered shutters at off-axis locations. Background leveling is needed to correct the uneven background. See John C. Russ, THE IMAGE PROCESSING HANDBOOK 187–90 (2nd ed. CRC press, Inc. 1995).

G. Image Display 3D information can be displayed in many different ways. One approach uses 2D pseudo-colors with dark background and light background. A series of slices at different focal planes may also be used to illustrate the 3D structure. 3D rotation and 3D rendered display can also be generated for volumetric view.

H. Fluorescent Images with Multiple Dyes

The algorithm can also be applied to images with more than one colored dyes. Each color of the image may be processed separately, i.e. optical sectioning and deconvolution, and image assembled together afterwards. Pseudo-color display may be modified to a narrow range around the original fluorescent color. One can still use slice by slice, or 3D rendered display.

I. Aperture Shape and Location Variations

The aperture shape and location relative to the axis is flexible. They do not have to have equal angular distribution. The shape of the aperture does not have to be round as shown in FIG. 1. Apertures may be any shape that does not cross the center and is consistent with the numerical aperture. Some possible shapes are circles, squares, pie slices, etc. The shape for each apertures can be the same or different.

J. Numerical Aperture Variations

The description of the algorithm in Example I used a medium numerical aperture, but not limited to it.

K. Method to obtain the Point Spread Function

The PSF can be obtained using micro-beads as described or can be calculated based on first principles. Example for FIGS. 4 to 7 used the same PSF for each layer as shown in Table 3.

K. Spatially Varying Point Spread Function

Often the optical system is not ideal and the PSF can vary as a function of distance from the center to the edge of the optical system. The layer and image sharpening algorithms can be appropriately modified to accommodate the spatially varying PSF. Using the centered PSF image as an example to show spatial variation, the centered PSF can be written as $C_{PSF}(x,y,nz;x'',y'',nz'')$ where $(x,y,nz)$ is coordinate relative to ideal center produced by the micro-bead and $(x'',y'',nz'')$ is the location of the micro-bead in the $C_{SPHERE}(x'',y'',nz'')$ L. Applications The 3D reconstruction method is not limited to microscope imaging. It can be applied to many different image acquisition instruments, such as handheld cameras, camera attached to long focal lens microscope (also known as telescope/microscopes), telescopes, retinal imaging instruments, etc. The implementation of the hardware will vary depending on the application. The images can be infrared, optical and ultra-violet.

For some image acquisition systems, one camera is sufficient to capture sequential pictures or directional images in a single exposure. For other acquisitions, simultaneous image capture using multiple cameras is also possible.

To obtain micron resolution images from a distance of a few inches, a long focal lens microscope is required and all the spatial filters for the apertures can be to be inside the long focal lens microscope.

The embodiments described above are merely given as examples and it should be understood that the invention is not limited thereto. It is of course possible to embody the invention in specific forms other than those described without departing from the spirit of the invention. Further modifications and improvements, which retain the basic underlying principles disclosed and claimed herein, are within the spirit and scope of this invention.

We claim:

1. A process for deriving three-dimensional information from a series of two-dimensional images which can be obtained without changing the position of the detector or its focus comprising:

obtaining at least three two-dimensional images of the same object:

one centered image with aperture positioned on the central optical axis; and two or more directional images taken with same numerical aperture but with the apertures located at different off axis positions;

wherein the image is sectioned into many depth layers such that the image in each layer is decoupled from other layers using point spread function associated with the imaging system, the image in each layer is sharpened independent of other layers, and the image is displayed indicating the three-dimensional structure of the imaged object.

2. The process as claimed in claim 1, wherein a deconvolution algorithm is used to sharpen the image in each layer.

3. The process as claimed in claim 2, wherein the deconvolution algorithm is selected from the group consisting of Gold's method, Richard-Lucy method, Schell's method, Jansson's method, and blind deconvolution.

4. The process as claimed in claim 1, wherein the number of directional images can be any integer greater than or equal to two.

5. The process as claimed in claim 1, wherein the directional images are equally distributed in the angular direction.

6. The process as claimed in claim 1, wherein the locations of the aperture for the directional images are equal distance from the axis.

7. The process as claimed in claim 1, wherein the shapes of the apertures for the directional images are identical or regular.

8. The process as claimed in claim 7, wherein the shape of the aperture is a circle.

9. The process as claimed in claim 7, wherein the shape of the aperture is a pie-slice.

10. The process as claimed in claim 7, wherein the shape of the aperture is a square.

11. The process as claimed in claim 1, wherein the procedure described in claim 1 is repeated at more than one focused planes to obtain ultra thick three-dimensional image, wherein additional sets of images at different focal distance can be taken by moving the microscope stage or by changing the focusing plane, and wherein each set of images are processed separately and then combined together to reconstruct the 3D object.

12. The process as claimed in claim 1, wherein the image display is two-dimensional pseudo-color.

13. The process as claimed in claim 1, wherein the image display is layer-by-layer.

14. The process as claimed in claim 1, wherein the image display is volumetric view.

15. The process as claimed in claim 1, wherein edge enhancement is used to further sharpen the image.

16. The process as claimed in claim 1, wherein it is applied to microscope images obtained with directional aperture hardware.

17. The process as claimed in claim 1, wherein it is applied to images obtained by cameras with modified apertures.

18. The process as claimed in claim 1, wherein it can be applied to images obtained by multiple cameras located at various locations.

19. The process as claimed in claim 1, wherein it can be applied to images obtained by long-focal lens microscopes with off-axis apertures.

20. The process as claimed in claim 1, wherein the image can be dark field fluorescent image.

21. The process as claimed in claim 22, wherein the image for each fluorescent color is performed separately.

22. The process as claimed in claim 1, wherein the image can be bright field image.

23. The process as claimed in claim 1, wherein the point spread function is calculated based on physical principles.

24. A method adaptable for use for obtaining point spread function for a microscope, comprising the steps of:

taking images of sub-resolution fluorescent beads distributed at appropriate depth and suspended in a fixed mounting media;

putting a pair of directional images and the centered image together in one image and giving each of them a different color;

finding at least one bead for each layer and cutting the corresponding kernels from the centered image and directional images with the center located at the middle of the centered PSF; and normalizing PSF for each layer to make the total intensity identical.

25. An instrument, adaptable for use for obtaining centered and directional images, comprising:

apertures that are located in the backplane of the microscope, apertures are controlled to open one at a time; and one centered aperture, and more than two off axis directional apertures;

at least one camera.

26. The instrument as claimed in claim 26, wherein more than one camera is used to capture some of the images produced by the apertures simultaneously.

27. The instrument as claimed in claim 26, wherein two or more of the images produced by the apertures are captured by one camera simultaneously.

* * * * *